United States Patent
Milbert et al.

(10) Patent No.: US 10,520,327 B2
(45) Date of Patent: Dec. 31, 2019

(54) SYSTEM AND METHOD FOR GENERATING TACTICAL ROUTES

(71) Applicant: Polaris Industries Inc., Medina, MN (US)

(72) Inventors: Randy L. Milbert, Edina, MN (US); Erik S. Freed, New Brighton, MN (US); Kyle K. Estes, Rosemount, MN (US)

(73) Assignee: Polaris Industries Inc., Medina, MN (US)

( * ) Notice: Subject to any disclaimer, the term of this patent is extended or adjusted under 35 U.S.C. 154(b) by 668 days.

(21) Appl. No.: 14/626,617

(22) Filed: Feb. 19, 2015

(65) Prior Publication Data

US 2015/0253145 A1 Sep. 10, 2015

Related U.S. Application Data

(63) Continuation of application No. 12/920,580, filed as application No. PCT/US2008/069314 on Jul. 7, 2008, now abandoned.

(51) Int. Cl.
*F41G 7/00* (2006.01)
*F41H 11/00* (2006.01)
(Continued)

(52) U.S. Cl.
CPC ......... *G01C 21/3461* (2013.01); *G01C 21/20* (2013.01)

(58) Field of Classification Search
CPC ............................ G01C 21/20; G01C 21/3461
See application file for complete search history.

(56) References Cited

U.S. PATENT DOCUMENTS

| 2,399,426 A | 4/1946 | Bradley |
|---|---|---|
| 4,947,350 A | 8/1990 | Murray |

(Continued)

FOREIGN PATENT DOCUMENTS

| CA | 2583458 | 4/2006 |
|---|---|---|
| CA | 2718788 | 1/2010 |

(Continued)

OTHER PUBLICATIONS

De Floriani, Leila et al.; Intervisibility on Terrains; 1999; John Wiley & Sons; Geographic Information Systems: Principles, Techniques, Management and Applications; pp. 543-556.*

(Continued)

*Primary Examiner* — Adam D Tissot

(74) *Attorney, Agent, or Firm* — Faegre Baker Daniels LLP

(57) ABSTRACT

A method and system for generating tactical routes includes an intervisibility database pre-populated with pre-computed optical lines of sight between locations or nodes in geographic terrain, an intervisibility analyzer for analyzing propagation of the pre-computed optical lines of sight between the locations or nodes in the geographic terrain, a speed analyzer for analyzing speeds of travelers across the locations or nodes in the geographic terrain, a cost generator for generating a blended cost grid using said intervisibility and speed analyses, and a route generator for generating routes that facilitate tactical movement based on said blended cost grid. The route generator computes intervisibility unions at the locations or nodes in the geographic terrain and minimizing intervisibility unions along the generated route.

15 Claims, 26 Drawing Sheets

(51) Int. Cl.
*F41H 11/16* (2011.01)
*G06F 17/00* (2019.01)
*G01C 21/34* (2006.01)
*G01C 21/20* (2006.01)

(56) References Cited

U.S. PATENT DOCUMENTS

| | | | |
|---|---|---|---|
| 4,954,958 | A | 9/1990 | Savage |
| 5,187,667 | A | 2/1993 | Short |
| 5,326,265 | A | 7/1994 | Prevou |
| 5,612,882 | A | 3/1997 | LeFebvre |
| 5,787,233 | A | 7/1998 | Akimoto |
| 5,838,262 | A | 11/1998 | Kershner |
| 5,850,617 | A | 12/1998 | Libby |
| 6,144,318 | A | 11/2000 | Hayashi |
| 6,182,007 | B1 | 1/2001 | Szczerba |
| 6,298,302 | B2 | 10/2001 | Walgers |
| 6,317,684 | B1 | 11/2001 | Roeseler |
| 6,401,038 | B2 | 6/2002 | Gia |
| 6,498,982 | B2 | 12/2002 | Bellesfield |
| 6,963,800 | B1 * | 11/2005 | Milbert ............ F41H 13/00 340/995.21 |
| 7,280,897 | B2 | 10/2007 | Allstadt |
| 7,474,960 | B1 | 1/2009 | Nesbitt |
| 7,549,403 | B2 | 6/2009 | Yamamoto |
| 7,702,454 | B2 | 4/2010 | Nesbitt |
| 7,756,635 | B2 | 7/2010 | Milbert |
| 7,818,116 | B1 | 10/2010 | Nesbitt |
| 8,014,941 | B2 | 9/2011 | Nagel |
| 8,150,620 | B2 | 4/2012 | Motoyama |
| 8,175,801 | B2 | 5/2012 | Tu |
| 8,374,792 | B2 | 2/2013 | White |
| 8,818,710 | B2 | 8/2014 | Milbert |
| 2006/0031004 | A1 * | 2/2006 | Lundberg ........... G01C 21/3461 701/533 |
| 2008/0167771 | A1 | 7/2008 | Whittaker |
| 2008/0189032 | A1 | 8/2008 | Beadman |
| 2009/0125229 | A1 | 5/2009 | Peri |
| 2009/0164111 | A1 | 6/2009 | Hosoi |
| 2010/0063731 | A1 | 3/2010 | Milbert |
| 2010/0094496 | A1 | 4/2010 | Hershkovitz |
| 2010/0100309 | A1 | 4/2010 | Hosoi |
| 2010/0211244 | A1 | 8/2010 | Jeong |
| 2010/0274487 | A1 | 10/2010 | Neff |
| 2011/0098914 | A1 | 4/2011 | Milbert |
| 2011/0251783 | A1 | 10/2011 | Doi |
| 2012/0029804 | A1 | 2/2012 | White |
| 2013/0311089 | A1 | 11/2013 | Freed |

FOREIGN PATENT DOCUMENTS

| | | |
|---|---|---|
| EP | 1477770 | 11/2004 |
| WO | WO 2004/029551 | 4/2004 |
| WO | WO 2010/005424 | 1/2010 |

OTHER PUBLICATIONS

Caldwell et al., "Analysis and Visualization of Visibility Surfaces" (2003).*

"Analysis and Visualization of Visibility Surfaces", D. R. Caldwell, et al., 2003, U.S. Army Engineer Research and Development Center; 11 pages.

"Intervisibility on Terrains", Leila De Floriani, et al.,1999, Department of Computer and Information Sciences, University of Genova; 15 pages.

On applying viewshed analysis for determining least-cost paths on Digital Elevation Models, Jay Lee, et al., 1998, Int. J. of Geographical Information Science, vol. 12, No. 8; pp. 891-905.

Written Opinion issued by the European Patent Office, dated May 28, 2009, for International Patent Application No. PCT/US2008/069314; 4 pages.

International Preliminary Report on Patentability issued by the European Patent Office, dated Jan. 11, 2011, for International Patent Application No. PCT/US2008/069314; 5 pages.

International Search Report issued by the European Patent Office, dated May 28, 2009, for International Patent Application No. PCT/US2008/069314; 2 pages.

"Propagation Effects on an Intervisibility Measurement System Operating in the SHF Band," E. J. Haakinson, et al., Feb. 1980, U.S. Dept. of Commerce, Chapters 2, 3, 4 and 6; 140 pages.

"A turn-by-turn navigation system for automotive telematics terminals," Park, et al., 2003, Intelligent Vehicles Symposium, Proceedings, IEEE; pp. 21-24.

"An optimal pathfinder for vehicles in real-world digital terrain maps", Jonsson, published 1997, section 4.3; 48 pages.

"ARA*: Anytime A* with Provable Bounds on Sub-Optimality" in Advances in Neural Information Processing Systems 16, Proceedings of the 2003 Conference; 8 pages.

"Artificial Intelligence: A Modern Approach", Stuart Russell, et al., Third Edition, Dec. 11, 2009; pp. 93 to 99.

Non-Final Office Action issued by the U.S. Patent and Trademark Office, dated May 3, 2012, for U.S. Appl. No. 12/920,580; 10 pages.

Response to Non-Final Office Action, dated Aug. 30, 2012, for U.S. Appl. No. 12/920,580; 8 pages.

Final Office Action issued by the U.S. Patent and Trademark Office, dated Sep. 25, 2012, for U.S. Appl. No. 12/920,580; 7 pages.

Response to Final Office Action, dated Jan. 22, 2013, for U.S. Appl. No. 12/920,580; 7 pages.

Non-Final Office Action issued by the U.S. Patent and Trademark Office, dated Feb. 11, 2013, for U.S. Appl. No. 12/920,580; 6 pages.

Response to Non-Final Office Action, dated Aug. 12, 2013, for U.S. Appl. No. 12/920,580; 11 pages.

Final Office Action issued by the U.S. Patent and Trademark Office, dated Sep. 5, 2013, for U.S. Appl. No. 12/920,580; 9 pages.

Response to Final Office Action, dated Nov. 1, 2013, for U.S. Appl. No. 12/920,580; 10 pages.

Non-Final Office Action issued by the U.S. Patent and Trademark Office, dated Dec. 24, 2013, for U.S. Appl. No. 12/920,580; 8 pages.

Response to Non-Final Office Action, dated Jun. 24, 2014, for U.S. Appl. No. 12/920,580; 11 pages.

Final Office Action issued by the U.S. Patent and Trademark Office, dated Jul. 22, 2014, for U.S. Appl. No. 12/920,580; 9 pages.

* cited by examiner

| Node | Coordinates |
|---|---|
| 3 | (0,2) |

500

| Node | Coordinates |
|---|---|
| 10 | (2,1) |

506

| Terrain Type | Speed |
|---|---|
| Field | 20 kph |
| Water | 0 kph |

504

| Node | Coordinates | Terrain Type |
|---|---|---|
| 1 | (0,0) | Field |
| 2 | (0,1) | Field |
| 3 | (0,2) | Field |
| 4 | (0,3) | Field |
| 5 | (1,0) | Field |
| 6 | (1,1) | Field |
| 7 | (1,2) | Field |
| 8 | (1,3) | Field |
| 9 | (2,0) | Field |
| 10 | (2,1) | Water |
| 11 | (2,2) | Field |
| 12 | (2,3) | Field |
| 13 | (3,0) | Field |
| 14 | (3,1) | Field |
| 15 | (3,2) | Field |
| 16 | (3,3) | Field |

502

| Node | Coordinates |
|---|---|
| 7 | (1,2) |

700

| Node | Coordinates | Viewshed |
|---|---|---|
| 7 | (1,2) | {(2,3), (1,2), (2,2), (1,1)} |

702

1300

| Node | Coordinates |
|---|---|
| 7 | (1,2) |

1302

| Node | Coordinates |
|---|---|
| 3 | (0,2) |

1304

| Node | Coordinates | Viewshed |
|---|---|---|
| 3 | (0,2) | {(0,3), (1,3), (0,2), (0,1)} |

1306

| Node | Coordinates | Union |
|---|---|---|
| 7 | (1,2) | {(2,3), (1,2), (2,2), (1,1)} |

1308

| Minimum Edge Cost | 0 |
|---|---|

SYSTEM AND METHOD FOR GENERATING TACTICAL ROUTES

CROSS-REFERENCE TO RELATED APPLICATIONS

This application is a continuation of U.S. application Ser. No. 12/920,580, filed on Sep. 1, 2010, which is a U.S. National Phase Application of PCT International Application No. PCT/US2008/069314, filed on Jul. 7, 2008, the disclosures of which are expressly incorporated by reference herein.

BACKGROUND OF THE INVENTION

Field of the Invention

The present invention generally relates to generation of tactical routes, and more particularly to a method and system for generating geographic terrain routes that balance speed and exposure to potential threats.

Discussion of the Background

Soldiers planning tactical routes must ensure that each route allows them to remain concealed from enemy observers yet move quickly at the same time. Creating these routes is a challenging process that requires great effort with no guarantee of desired results.

First, soldiers must gather intelligence on the terrain to be traversed. Often, this comes in the form of topographic maps, aerial photos, incident reports, previous mission plans, and firsthand knowledge. Soldiers operating in areas with more attention and traffic may receive accurate, up to date maps; others, like Special Forces soldiers operating in remote terrain, may receive local maps that are often highly outdated. Soldiers have helpful acronyms to help them remember what factors to consider when analyzing terrain and gathering intelligence for route planning, such as OCOKA (observation, concealment and cover, obstacles, key terrain, and avenues of approach). Soldiers also analyze the contour lines in topographic maps in an attempt to visualize the lay of the land. Reading contour maps and visualizing terrain is a skill that takes years of training and practice to refine and use properly. Satellites and spy planes flying overhead provide aerial photographs that reveal critical details about the battlefield terrain, such as vegetation, structures, and enemy force composition.

Next, soldiers use the intelligence gathered to plan a route. Choosing a starting location first, often a forward operating base, combat outpost, or objective rally point, soldiers then plan routes one waypoint at a time. Many soldiers use digital mapping software, either on personal computers or global positioning system (UPS) devices, to place waypoints. Software then connects each subsequent waypoint placed by the soldier with a straight line. In complex terrain, soldiers are forced to look closely at the map, placing waypoints close together so that the connecting lines do not intersect buildings and other obstructions. Often, soldiers spend hours placing hundreds of waypoints in this manner, refining route legs and tweaking waypoints, until the route reaches the destination. At this point, a primary route has been planned, but that is not good enough; on top of that, soldiers will generate at least one more, and typically three more routes to account for contingent and emergency situations. These routes must still be fast and safe to travel but sufficiently different from each other to be expedient in the field.

Finally, soldiers traverse the route. Sometimes, route traversal will be preceded by a route reconnaissance where one or more scouts observe the avenues of approach used by the route for enemy action or other interesting intelligence. When soldiers finally embark on the route, there is usually no guarantee that the intelligence used to plan the route has not since changed drastically. Knowing this, each soldier ensures that he knows his current position at all times so that he can react quickly if the plan changes. Evidence that the plan can (and often does) change can be found in accounts of the Battle of Mogadishu, Battle for Baghdad, and countless others.

From the above description of tactical route planning, it is easy to see that planning tactical routes correctly is extremely difficult. Imagine how a soldier's workflow would look if assisted by a computer software tool for planning tactical routes. First, the amount of time and effort spent analyzing intelligence is decreased because the tool analyzes every single terrain cell. Second, the amount of time and effort spent meticulously dropping hundreds of waypoints for multiple routes is greatly reduced because the tool automatically generates routes. A soldier using that kind of tactical route planning tool would be able to spend less time on detailed planning and more time on other important tasks, such as route reconnaissance or mission execution.

However, soldiers have not had access to such a tactical route planning tool in the past. While many civilians benefit daily from analogous route planning tools (MapQuest, Google Maps, and Microsoft Streets and Trips) that help them plan fast and short routes along highway networks, soldiers have simply not had access to that kind of tool for military purposes.

The state of the art 111 tactical route generation suffers from the following important disadvantages:

Fails to suggest intelligent ground maneuvers. Although the state of the art for path planning and terrain awareness in the field of aviation is well-developed, the state of the art in providing similar tools for ground-based maneuvers is lacking. Few tools currently exists that suggest intelligent schemes of maneuver on the ground that utilize terrain information such as land cover maps and digital elevation models.

Fails to blend speed and concealment. During tactical movement, soldiers need to move quickly while remaining concealed, taking advantage of fast terrain that also provides sufficient concealment and cover. However, the state of the art commonly generates routes that aim to maximize concealment or speed with no thought as to how these factors could be blended to provide a more usable route. As a result, tactical routes created using state of the art methods often suffer from being too exposed when maximizing speed or too slow when maximizing concealment.

SUMMARY OF THE INVENTION

Therefore, there is a need for a method and system that addresses the above and other problems. The above and other problems are addressed by the exemplary embodiments of the present invention, which generates geographic routes that facilitate tactical movement through surrounding terrain.

Accordingly, in exemplary aspects of the present invention there is provided a computer-implemented system and method for generating tactically-feasible routes in battlefield terrain including an Intervisibility Analyzer for analyzing propagation of optical lines of sight in a geographic terrain, a Speed Analyzer for analyzing speed of travelers in the geographic terrain, and a Route Generator for generating routes that facilitate tactical movement.

The Intervisibility Analyzer utilizes a digital elevation model of terrain to compute a populate a database of viewsheds for each point in the model, where each viewshed is a set of other points having optical line of sight to the point.

The Speed Analyzer determines how fast a traveler may move across varying types of terrain.

The Route Generator searches the nodes and edges in a graph representing the cost grid to generate the best path between a start and end point.

Advantageously, the exemplary embodiments include various features that are of particular utility, for example, including suggesting intelligent ground maneuvers. The exemplary embodiments provide to ground soldiers what aviators have had for quite some time: intelligent routing tools that suggest the correct path of travel based on environmental factors like terrain types and visibility.

In addition, the exemplary embodiments blend speed and concealment during route generation, helping to ensure that soldiers can reach the destination quickly and unobserved.

In addition, The exemplary embodiments mimic the way soldiers actually plan concealed tactical routes. During tactical movement, soldiers accept exposure to the surrounding area, but with every step, try to minimize the amount of new terrain to which they are exposed. This explains why rounding corners, entering rooms, and coming up over ridges are all dangerous movements; they expose the soldier to large amounts of previously hidden terrain all at once. The exemplary embodiments create routes that minimize the amount of new terrain to which route travelers are exposed during travel and do so by minimizing the sums of the sizes of the unions of the sets of points visible to each route waypoint. This key technique is subtly different and yet vastly superior to any existing technique which tries to minimize the sums of the sizes of the sets of points visible to each route waypoint because it mimics the way soldiers actually plan tactical routes.

In addition, the exemplary embodiments maximize any advantages in weapons range. Soldiers in tactical environments may sometimes desire to move in open areas where terrain allows them to move quickly and their weapons capabilities are maximized for the areas visible during travel. Soldiers moving in this fashion leverage routes through open areas to stay outside the range of enemy weaponry but inside the range of their own weaponry and visibility. The exemplary embodiments generate routes that allow soldiers to maximize the advantages in range afforded by their weapons and have the capability to generate routes that utilize both highly visible and fast terrain, thereby allowing a soldier to more fully leverage any potential advantages in weapons (e.g., 50 caliber guns) or surveillance (e.g., night vision).

In addition, the exemplary embodiments create routes that facilitate efficient searching between waypoints. Soldiers in tactical environments may sometimes desire to travel between two waypoints while maximizing the amount of visible terrain per unit of distance travelled. Generating a route like this by hand would be extremely difficult for a human. The exemplary embodiments generate routes that maximize visibility per unit distance travelled and do so by exposing travelers to the largest collective area of terrain while minimizing the distance travelled.

Still other aspects, features, and advantages are readily apparent from the following detailed description, by illustrating a number of exemplary embodiments and implementations. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 13 illustrates a Cost Evaluator Example;
FIGS. 15A-F illustrate a second Route Generator Example.

DETAILED DESCRIPTION OF THE PREFERRED EMBODIMENTS

An exemplary embodiment for generating tactical routes is one that minimizes the path's intervisibility union while meeting speed constraints by avoiding slow terrain. By minimizing the path's intervisibility union, travelers are exposed to a minimal amount of previously-unexposed terrain after beginning travel, thereby reducing the risk of encountering enemies in unexposed terrain. By avoiding slow terrain below an arbitrary threshold, travelers can travel at or above the speed threshold at every node on the path, rendering it difficult for enemies to engage the traveler in combat.

Figure 1:
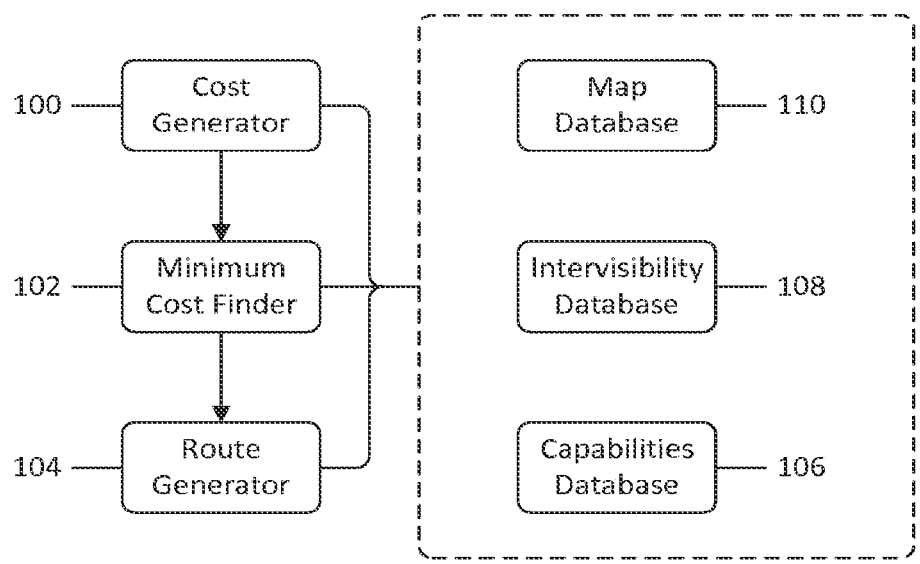
FIG. 1 illustrates an Overall System for Tactical Routing.

Referring now to the drawings, FIG. 1 illustrates the system's main components of the exemplary embodiment for generating routes that minimize the path's intervisibility union while meeting speed constraints by avoiding slow terrain. The Cost Generator 100 uses speed and visibility information to create a blended cost grid for generating tactical routes. The Minimum Edge Cost Finder 102 searches the edges of a graph to find the minimum cost edge which is used in computing heuristics while generating tactical routes. The Route Generator 104 generates tactical routes. Each of the components has access to a collection of databases. The Map Database 110 contains geographic information including land cover maps, cost surfaces, and graphs. The Map Database 110 is a standard Geographic Information System (GIS) such as Mapinfo by ESRI, Inc. of Redlands, Calif. The Intervisibility Database 108 contains viewsheds where each viewshed is a set of terrain locations having optical line of sight to an observing location. Algorithms for computing viewsheds use digital elevation models (DEMs) of varying resolution and complexity, and these algorithms are well-known to those skilled in the art of terrain analysis. An example of one such algorithm for computing viewsheds is the ESRI Visibility algorithm in the ISurfaceOp package. As such, the Intervisibility Database 108 is populated with pre-computed viewsheds, and the computation of these viewsheds for example, can be performed using ESRI's "Visibility" function, available on the World Wide Web at webhelp.esri.com/arcgisdesktop/9.1/body.cfm?toeVisable=0&ID=3189&TopicName=visibility, and incorporated by reference herein. Also, storing viewsheds for DEMs in an easily-accessible format is non-trivial due to memory complexity; however, methods for doing so are also known to those skilled in the art of terrain analysis. As such, storage of the viewsheds and the architecture and formation of the Intervisibility Database 108 can be performed, for example, using "Analysis and Visualization of Visibility Surfaces", at www.geocomputation.org/2003/Papers/Caldwell_Paper.pdf, and incorporated by reference herein. The Intervisibility Database 108 is rectified to match the coordinates used in the Map Database 110. The Capabilities Database 106 contains a traversal matrix for mapping land cover types to traversal speeds and a visibility matrix for mapping visibility parameters to varying observer capabilities.

The following sections describe in detail the components of the exemplary embodiments.

Figure 2A:
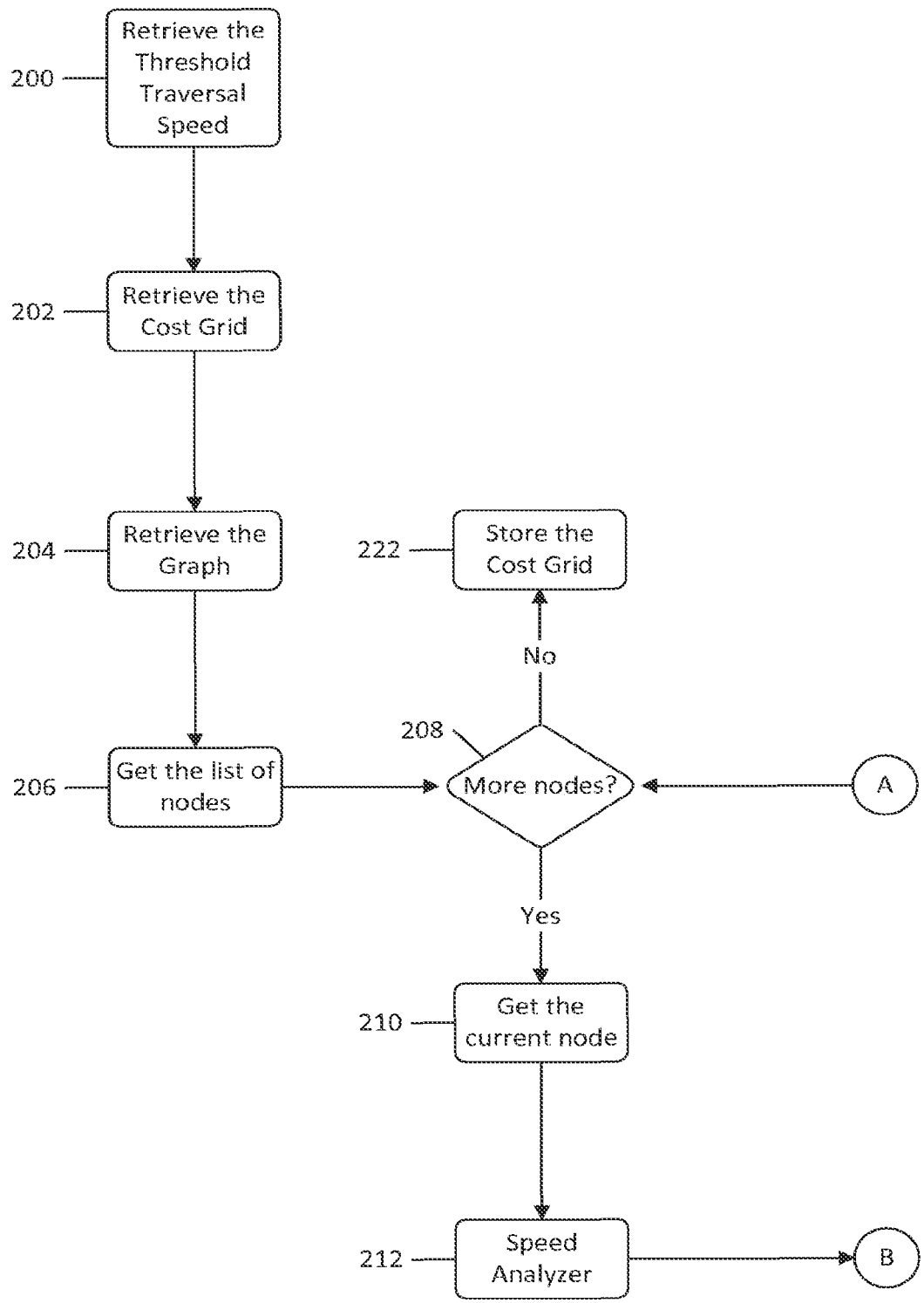
FIGS. 2A&B illustrate a Cost Generator.
Figure 2B:
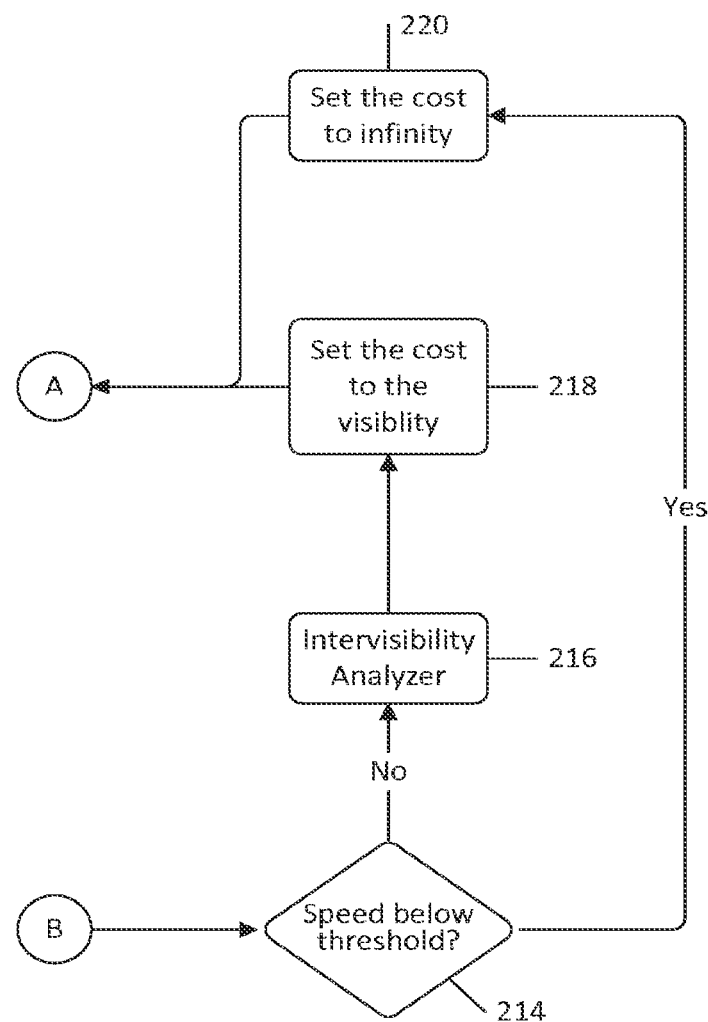

FIG. 2 illustrates the Cost Generator 100 of the exemplary embodiment for generating routes that minimize the path's intervisibility union while meeting speed constraints by avoiding slow terrain. The Cost Generator 100 begins at step 200 by retrieving the threshold traversal speed from the Capabilities Database 106. At step 202, the Cost Generator 100 retrieves the cost grid from the Map Database 110. At step 204, the Cost Generator 100 retrieves the graph from the Map Database 110. At step 206, the Cost Generator 100 obtains the list of nodes from the graph. At step 208, the Cost Generator 100 determines if there are more nodes to evaluate. If not, at step 222, the Cost Generator 100 stores the now-populated cost grid back to the Map Database 110 and terminates. If so, at step 210, the Cost Generator 100 gets the current node and proceeds to step 212. At step 212, the Cost Generator 100 obtains the node's speed by passing the node to the Speed Analyzer 212. At step 214, the Cost Generator 100 determines whether the node's speed is below the threshold traversal speed. If so, at step 220, the Cost Generator 100 sets the node's corresponding cell in the cost grid to a cost of infinity to indicate the node is impassable and proceeds to step 208. If not, at step 216, the Cost Generator 100 obtains the node's visibility by passing the node to the Intervisibility Analyzer 216 and proceeds to step 218. At step 218, the Cost Generator 100 sets the node's corresponding cell in the cost grid to the visibility and continues evaluating nodes by proceeding to step 208. At step 222, the Cost Generator 100 stores the cost grid. Upon termination after step 222, the Cost Generator 100 will have set the cost of each node's corresponding cell in the cost grid in the Map Database 110. The Cost Generator 100 constructs the cost grid to facilitate the Route Generator 104 avoiding nodes having too slow a traversal speed (i.e., traversal speeds below a threshold value).

Figure 3:
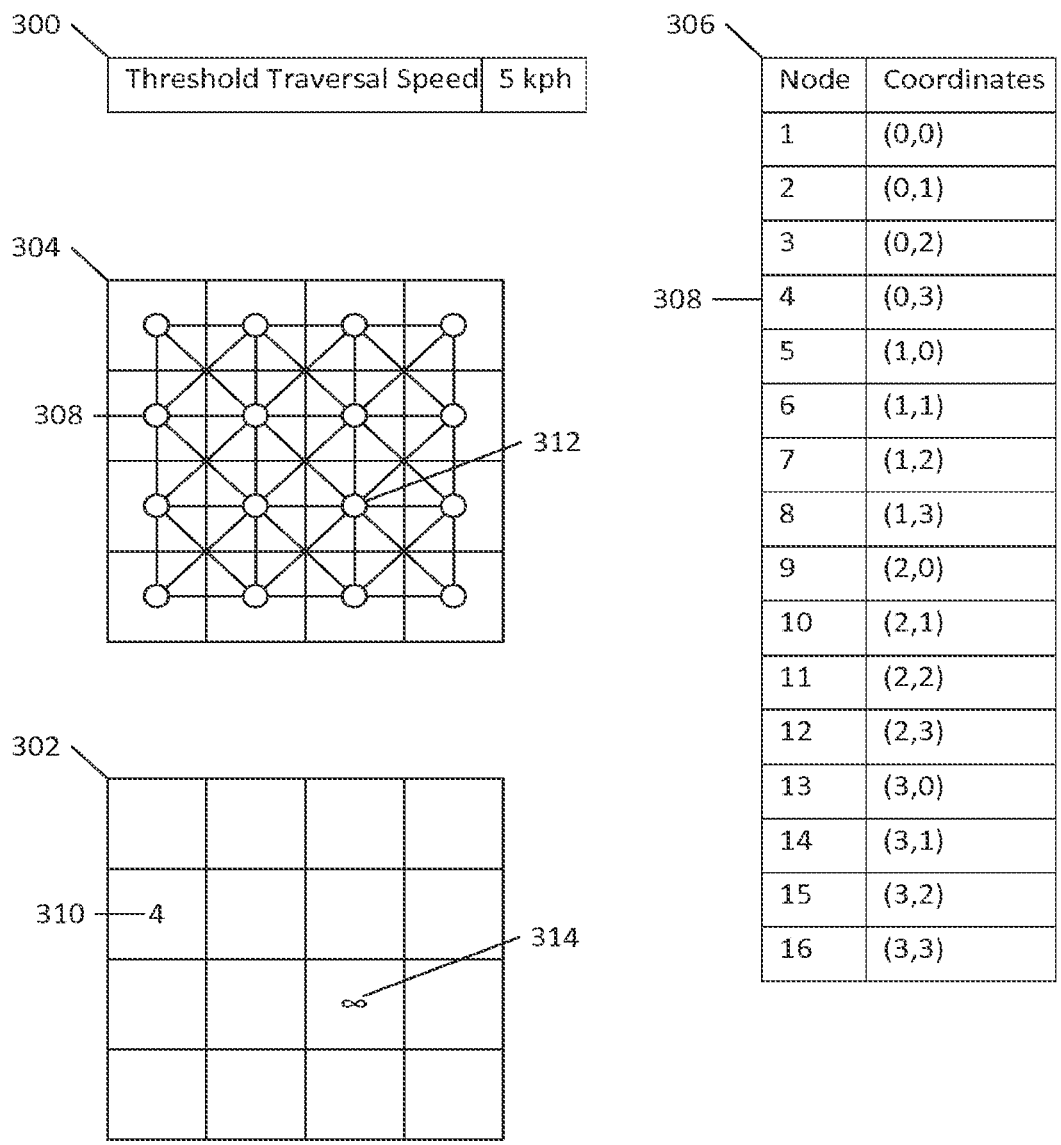
FIG. 3 illustrates Cost Generator Example.

To better understand the Cost Generator 100 of the exemplary embodiment for generating routes that minimize the path's intervisibility union while meeting speed constraints by avoiding slow terrain, consider the example in FIG. 3. The Cost Generator 100 first retrieves the threshold traversal speed 300 from the Capabilities Database 106. Next, the Cost Generator 100 retrieves the cost grid 302 from the Map Database 110. Next, the Cost Generator 100 retrieves the graph 304 from the Map Database 110. Next, the Cost Generator 100 obtains the node list 306 from the graph 304. Next, the Cost Generator 100 examines each node in the node list 306. In this example 300, the Cost Generator 100 selects node 308 with label 3 at position (0, 2). Next, the Cost Generator 100 passes the node 308 to the Speed Analyzer 212. The Speed Analyzer 212 returns a speed of 20 kph. Next, the Cost Generator 100 determines that the speed of the node 308, 20 kph, is not below the threshold traversal speed 300 of 5 kph. Next, the Cost Generator 100 passes the node 308 to the Intervisibility Analyzer 216. The Intervisibility Analyzer 216 returns a visibility of 4 cells. Next, the Cost Generator 100 sets the corresponding cell 310 with label 3 at position (0,2) in the cost grid 302 to 4 and continues evaluating nodes until termination. In another example, the Cost Generator 100 selects node 312 with label 10 at position (2,1). Next, the Cost Generator 100 passes the node 312 to the Speed Analyzer 212. The Speed Analyzer 212 returns a speed of 0 kph. Next, the Cost Generator 100 determines that the speed of the node 312, 0 kph, is below the threshold traversal speed 300 of 5 kph. Next, the Cost Generator 100 sets the corresponding cell 314 with label 10 at position (2,1) in the cost grid 302 to infinity (∞) and continues evaluating nodes until termination. After evaluating each node in the node list 306. the Cost Generator 100 will have set the costs of each corresponding cell in the cost grid 302. The Cost Generator 100 then terminates.

Figures 4, 5:
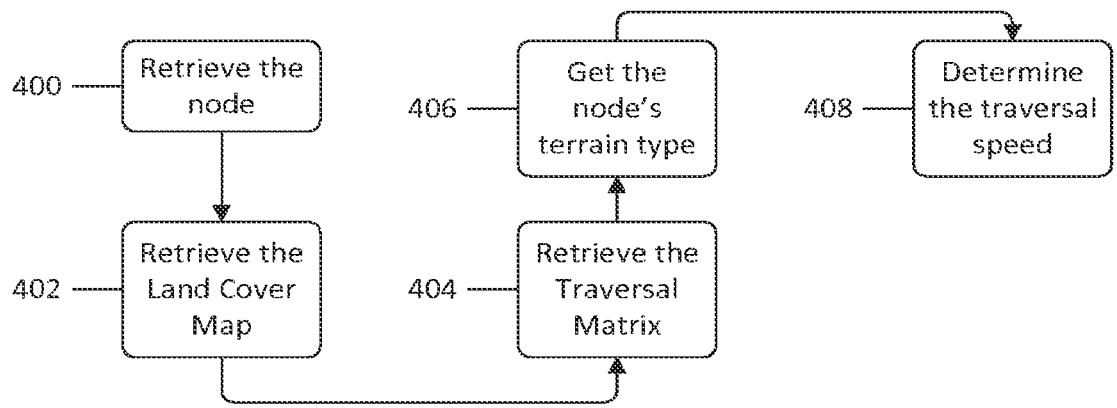
FIG. 4 illustrates a Speed Analyzer.
FIG. 5 illustrates a Speed Analyzer Example

FIG. 4 illustrates the Speed Analyzer 212 of the exemplary embodiment for generating routes that minimize the path's intervisibility union while meeting speed constraints by avoiding slow terrain. The Speed Analyzer 212 begins at step 400 by retrieving the node passed in from the Cost Generator 100. At step 402, the Speed Analyzer 212 retrieves the land cover map from the Map Database 110. At step 404, the Speed Analyzer 212 retrieves the traversal matrix from the Capabilities Database 106. At step 406, the Speed Analyzer 212 queries the land cover map for the node's terrain type using the node's position. At step 408, the Speed Analyzer 212 returns the speed of the terrain type found in the traversal matrix and terminates. Upon termination, the Speed Analyzer 212 has found the speed for the node. Speeds represent how fast a traveler can travel across the terrain represented by the node.

To better understand the Speed Analyzer 212 of the exemplary embodiment for generating routes that minimize the path's intervisibility union while meeting speed constraints by avoiding slow terrain, consider the example in FIG. 5. The Speed Analyzer 212 retrieves the node 500 with label 3 at position (0,2) from the Cost Generator 100. Next, the Speed Analyzer 212 retrieves the land cover map 502 from the Map Database 110. Next, the Speed Analyzer 212 retrieves the traversal matrix 504 from the Capabilities Database 106, Next, the Speed Analyzer 212 queries the land cover map 502 for the terrain type of the node 500 with label 3 at position (0,2). The land cover map 502 indicates that the terrain type of the node 500 with label 3 at position (0,2) is field. Next, the Speed Analyzer 212 queries the traversal matrix 504 for the speed of the field terrain type. The traversal matrix 504 indicates that the speed of the field terrain type is 20 kph. The Speed Analyzer 212 then terminates by returning a speed of 20 kph. In another example, the Speed Analyzer 212 retrieves the node 506 with label 10 at position (2,1) from the Cost Generator 100. Later, the Speed Analyzer 212 queries the land cover map 502 for the terrain type of the node 506 with label 10 at position (2,1). The land cover map 502 indicates that the terrain type of the node 506 with label 10 at position (2,1) is water. Next, the Speed Analyzer 212 queries the traversal matrix 504 for the speed of the water terrain type. The traversal matrix 504 indicates that the speed of the water terrain type is 0 kph. The Speed Analyzer 212 then terminates by returning a speed of 0 kph.

Figures 6, 7:
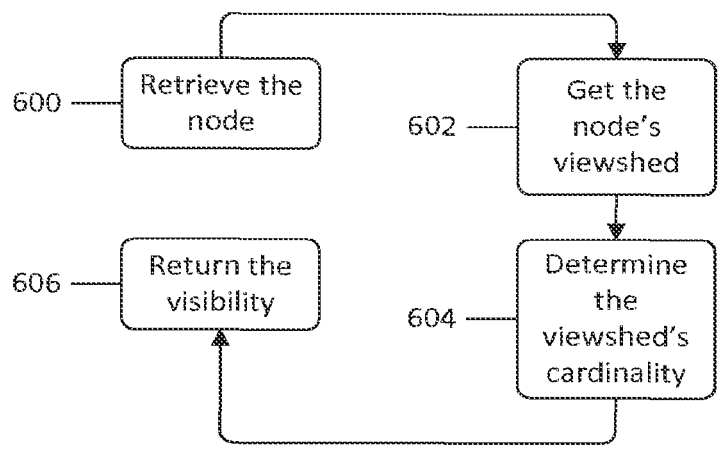
FIG. 6 illustrates an Intervisibility Analyzer.
FIG. 7 illustrates an Intervisibility Analyzer Example.

FIG. 6 illustrates the Intervisibility Analyzer 216 of the exemplary embodiment for generating routes that minimize the path's intervisibility union while meeting speed constraints by avoiding slow terrain. The Intervisibility Analyzer 216 begins at step 600 by retrieving the node passed in from the Cost Generator 100. At step 602, the Intervisibility Analyzer 216 queries the Intervisibility Database 108 for the node's viewshed V using the node's position. The viewshed V is a set whose elements comprise the nodes having optical line of sight to the node, and the Intervisibility Database 108 is the record of all such sets. At step 604, the Intervisibility Analyzer 216 counts the number of elements in V to determine the V's cardinality (size), |V|. At step 606, the Intervisibility Analyzer 216 terminates by returning IV as the visibility. Upon termination, the Intervisibility Analyzer 216 has found the visibility for the node. Visibility quantifies the extent to which a traveler is exposed when traveling across the terrain represented by the node.

To better understand the Intervisibility Analyzer 216 of the exemplary embodiment for generating routes that minimize the path's intervisibility union while meeting speed constraints by avoiding slow terrain, consider the example in FIG. 7. The Intervisibility Analyzer 216 retrieves the node 700 with label 7 at position (1,2) from the Cost Generator 100. Next, the Intervisibility Analyzer 216 queries the Intervisibility Database 108 for the viewshed 702 of the node 700 with label 7 at position (1,2). The Intervisibility Database 108 indicates that the viewshed 702 of the node 700 with label 7 at position (1,2) (2,3), (1,2), (2,2), (1,1)). Next, the Intervisibility Analyzer 216 counts the number of elements in the viewshed 702 to determine the cardinality (size) of viewshed 702. The Intervisibility Analyzer 216 determines that the visibility is 4. Next, the Intervisibility Analyzer 216 terminates by returning 4.

Figure 8A:
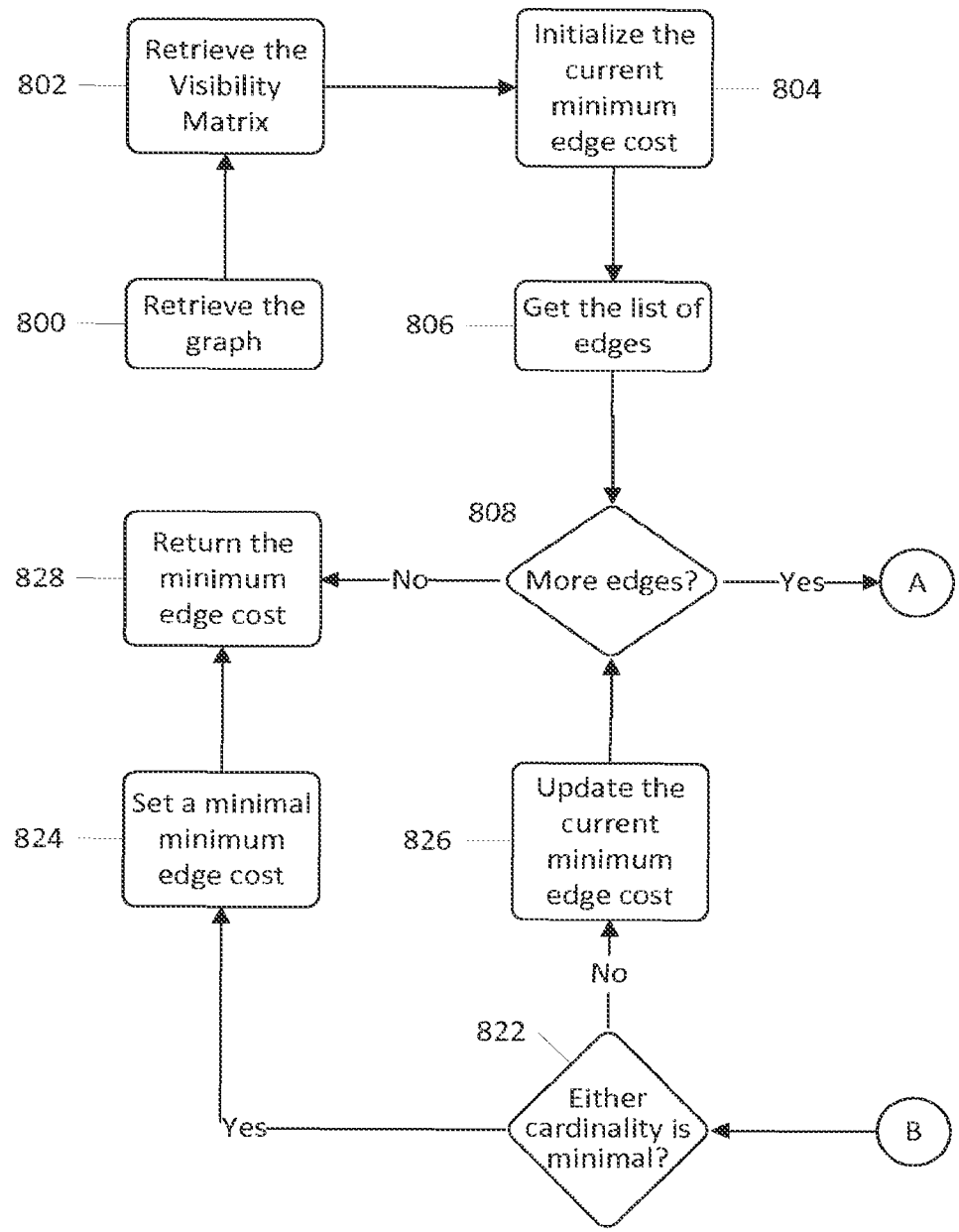
FIGS. 8A&B illustrate a Minimum Edge Cost Finder.
Figure 8B:
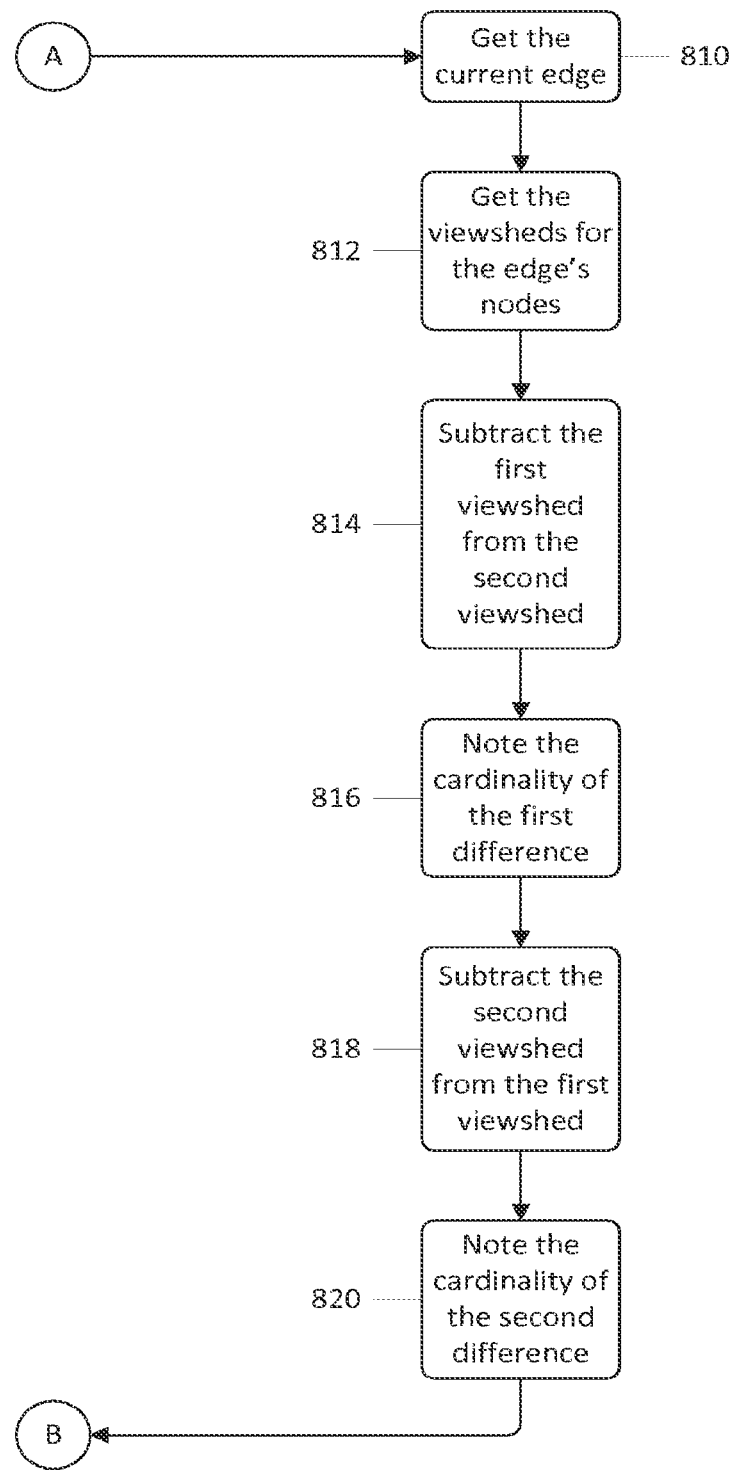

FIG. 8 illustrates the Minimum Edge Cost Finder 102 of the exemplary embodiment for generating routes that minimize the path's intervisibility union while meeting speed constraints by avoiding slow terrain. The Minimum Edge Cost Finder 102 begins at step 800 by retrieving the graph as input. At step 802, the Minimum Edge Cost Finder 102 retrieves the visibility matrix from the Intervisibility Database 108. At step 804, the Minimum Edge Cost Finder 102 sets the current minimum edge cost C to the maximum viewshed cardinality indicated by the visibility matrix. At step 806, the Minimum Edge Cost Finder 102 obtains the list of edges from the graph. At step 808, the Minimum Edge Cost Finder 102 determines if there are more edges to evaluate. If not, at step 828, the Minimum Edge Cost Finder 102 returns C. If so, at step 810, the Minimum Edge Cost Finder 102 obtains the current edge from the graph. At step 812, the Minimum Edge Cost Finder 102 queries the Intervisibility Database 108 for the viewsheds V1 and V2 of the Edge's nodes N1 and N2 using the nodes' positions. The viewsheds V1 and V2 are sets whose elements comprise the nodes having optical line of sight to nodes Ni and N2 respectively. At step 814, the Minimum Edge Cost Finder 102 calculates a first difference D 1 by subtracting V2 from V1 using set subtraction, as indicated by the following formula:

$$D1 = V1 - V2$$

D1 represents the set of elements in V 1 and not in V2. At step 816, the Minimum Edge Cost Finder 102 counts the number of elements in DI to determine the DI's cardinality, |D1|. At step 818, the Minimum Edge Cost Finder 102 calculates a second difference D2 by subtracting V1 from V2 using set subtraction, as indicated by the following formula:

$$D2 = V2 - V1$$

D2 represents the set of elements in V2 and not V1. It is noteworthy that DI may or may not be equal to D2. At step 820, the Minimum Edge Cost Finder 102 counts the number of elements in D2 to determine the D2's cardinality, |D2|. At step 822, the Minimum Edge Cost Finder 102 tests if |D1| or |D2| equals 0 (is minimal). If so, the Minimum Edge Cost Finder 102 sets C to 0 at step 824 and returns C at step 828. If not, at step 826, the Minimum Edge Cost Finder 102 updates C to the smaller of |D1|, |D2|, and C, as indicated by the following formula:

$$C = \mathrm{Minimum}(|D1|, |D2|C)$$

At step 808, the Minimum Edge Cost Finder 102 continues evaluating edges. Upon termination after step 828, the Minimum Edge Cost Finder 102 will have found C, the smallest possible incremental cost of moving from one node to any adjacent node in any direction.

Figure 9:
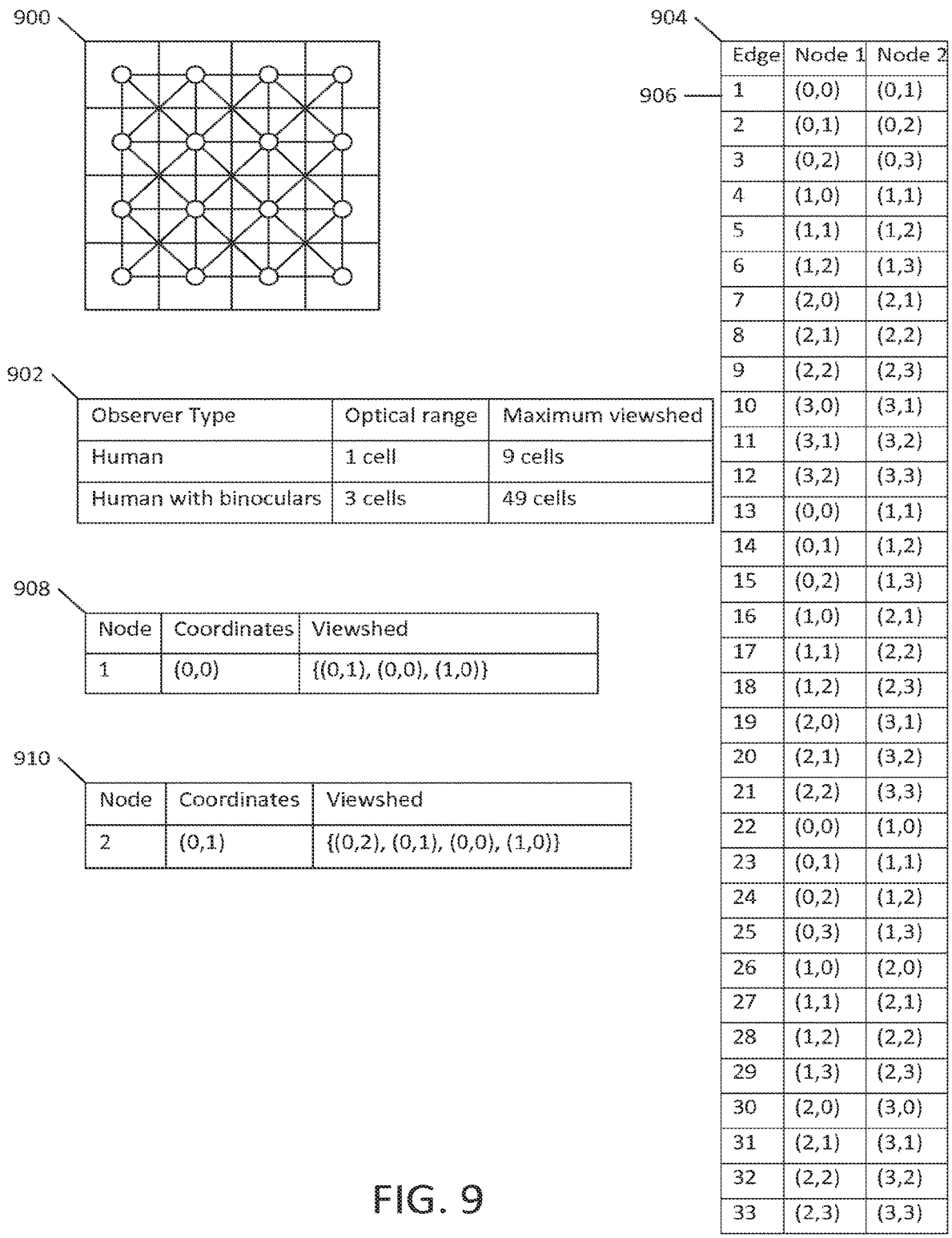
FIG. 9 illustrates a Minimum Edge Cost Finder Example.

To better understand the Minimum Edge Cost Finder 102 of the exemplary embodiment for generating routes that minimize the path's intervisibility union while meeting speed constraints by avoiding slow terrain, consider the example in FIG. 9. First, the Minimum Edge Cost Finder 102 retrieves the graph 900 as input. Next, the Minimum Edge Cost Finder 102 retrieves the visibility matrix 902 from the Intervisibility Database 108. Next, the Minimum Edge Cost Finder 102 sets the current minimum edge cost C to the maximum viewshed cardinality indicated by the visibility matrix 904. In this example, the observer type is human, so the Minimum Edge Cost Finder 102 sets C to 9. Next, the Minimum Edge Cost Finder 102 obtains the edge list 904 from the graph 900. Next, in this example, the Minimum Edge Cost Finder 102 selects the edge 900 with label 1 for evaluation. Next, the Minimum Edge Cost Finder 102 queries the Intervisibility Database 108 for the viewshed V1 908 of the first node of the edge 906. Next, the Minimum Edge Cost Finder 102 queries the Intervisibility Database 108 for the viewshed V2 910 of the second node of the edge 906. Next, the Minimum Edge Cost Finder 102 calculates a first difference D1 by subtracting V2 from V1 using set subtraction as follows:

$$D1 = V1 - V2 = \{(0,1),(0,0),(1,0)\} - \{(0,2),(0,1),(0,0),(1,0)\} = \varphi$$

D1 represents the set of elements in V1 and not in V2; in this example, V1 has no elements not in V2, so DI is the empty set ($\varphi$). Next, the Minimum Edge Cost Finder 102 counts the number of elements in D1 to determine D1's cardinality, |D1|. In this case, |D1|=0. Next, the Minimum Edge Cost Finder 102 calculates a second difference D2 by subtracting V1 from V2 using set subtraction as follows:

$$D2 = V2 - V1 = \{(0,2),(0,1),(0,0),(1,0))-\{(0,1(0,0),(1,0))=\{(0,2)\}$$

D2 represents the set of elements in V2 not in V1; in this example, V2 has some elements not in V1. Next, the Minimum Edge Cost Finder 102 counts the number of elements in D2 to determine the D2's cardinality, |D2|. In this case, |D2|=1. Next, the Minimum Edge Cost Finder 102 tests if |D1| or |D2|equals 0 (is minimal). In this example, |D1|=0, so the Minimum Edge Cost Finder 102 sets C to 0 and terminates by returning C.

Figure 10:
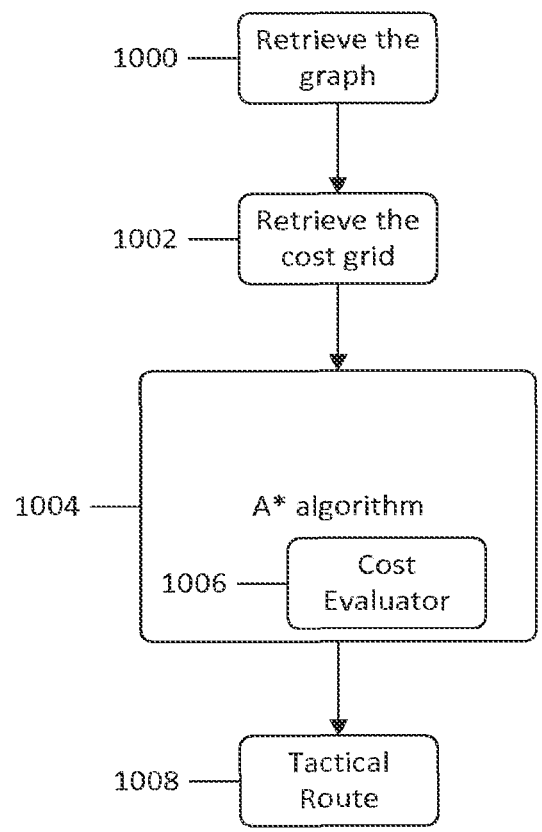
FIG. 10 illustrates a Route Generator.
Figure 11A:
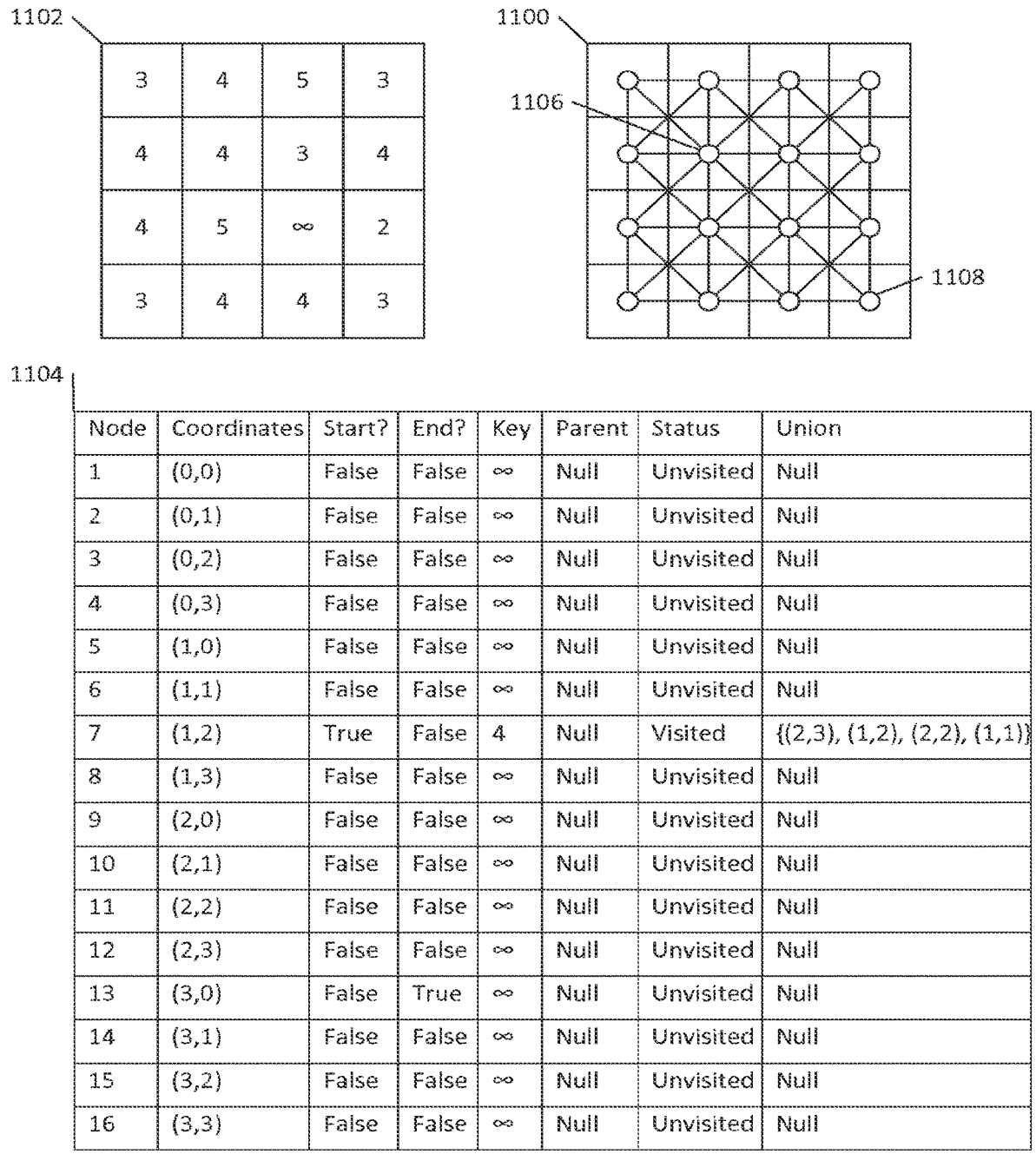
FIGS. 11A-E illustrate a Route Generator Example.
Figure 11B:
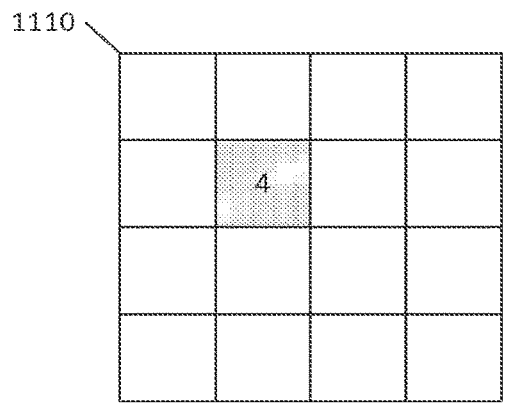
Figure 11B:
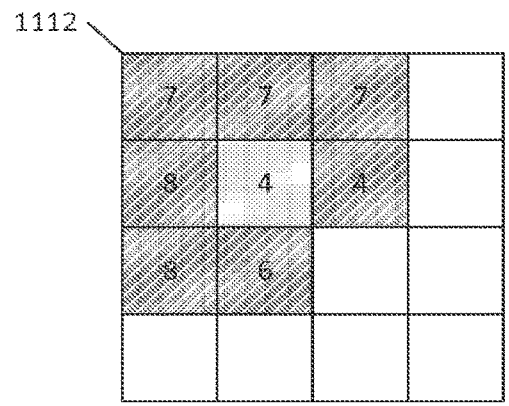
Figure 11B:
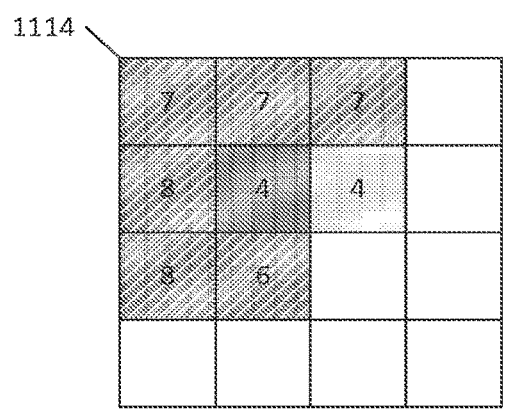
Figure 11B:
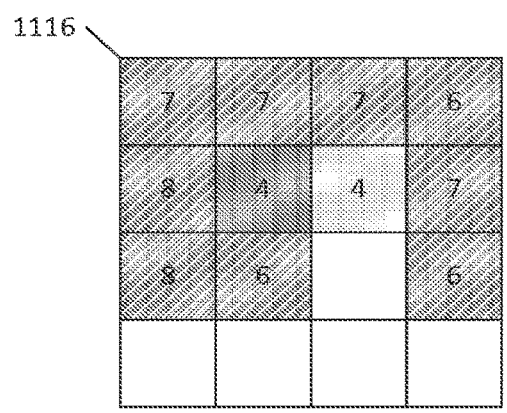
Figure 11B:
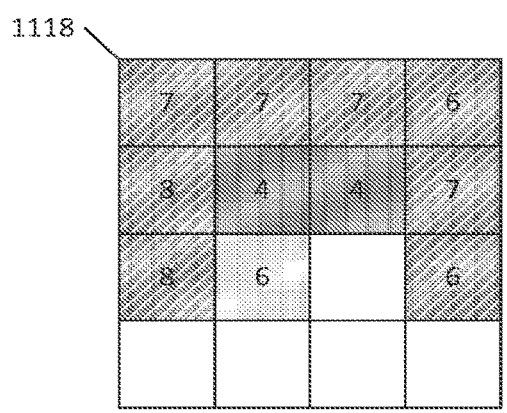
Figure 11B:
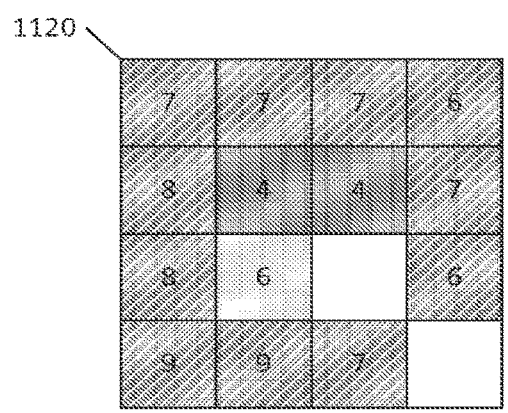
Figure 11C:
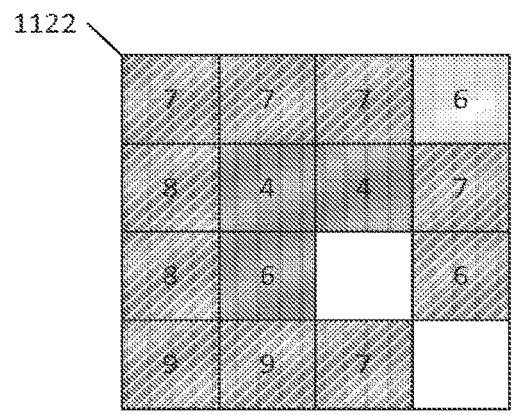
Figure 11C:
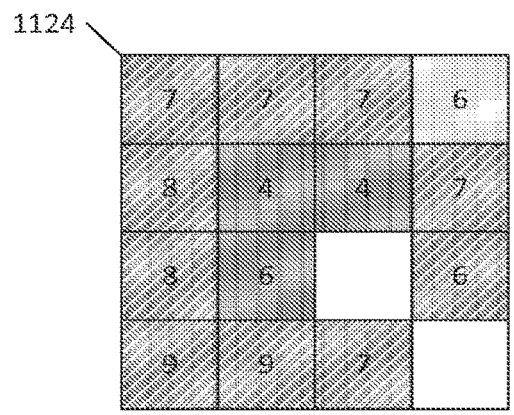
Figure 11C:
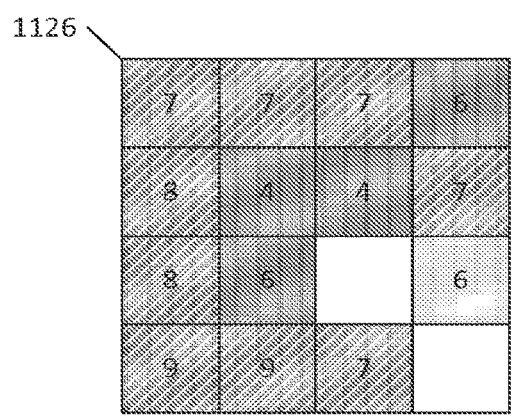
Figure 11C:
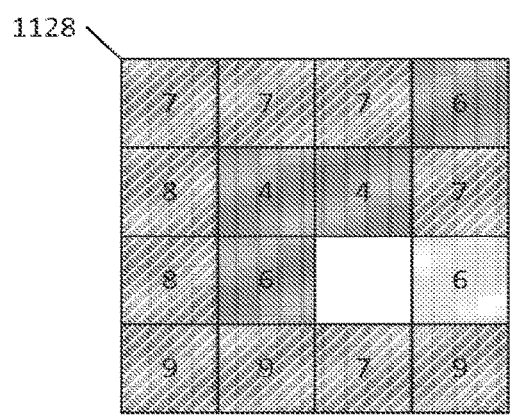
Figure 11C:
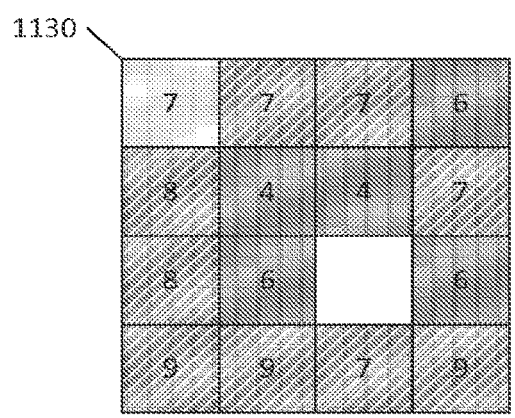
Figure 11C:
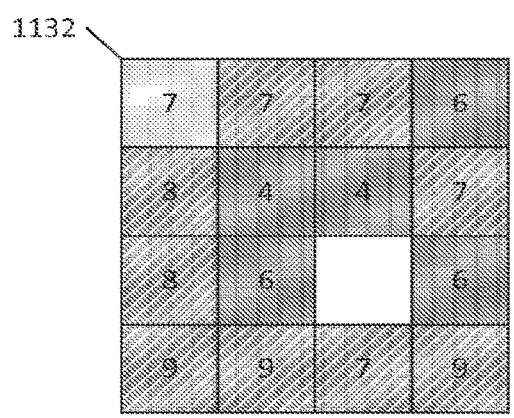
Figure 11D:
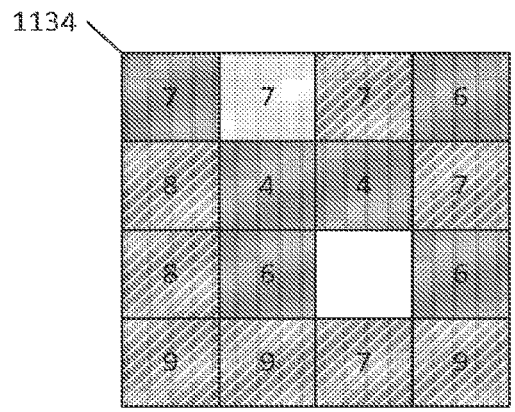
Figure 11D:
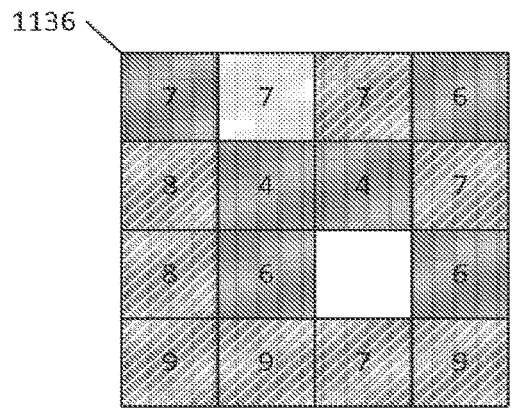
Figure 11D:
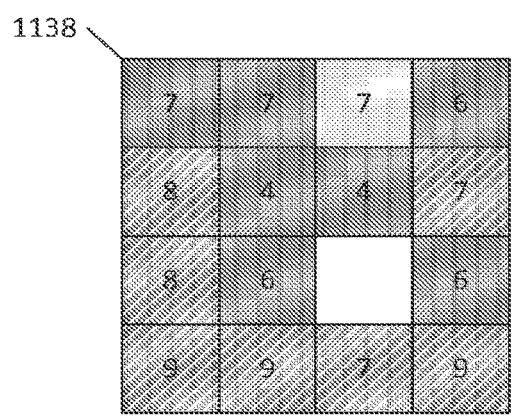
Figure 11D:
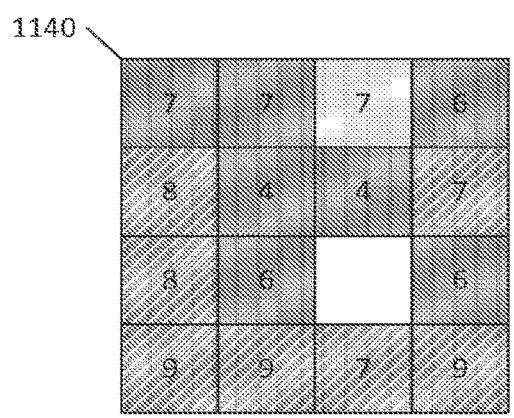
Figure 11D:
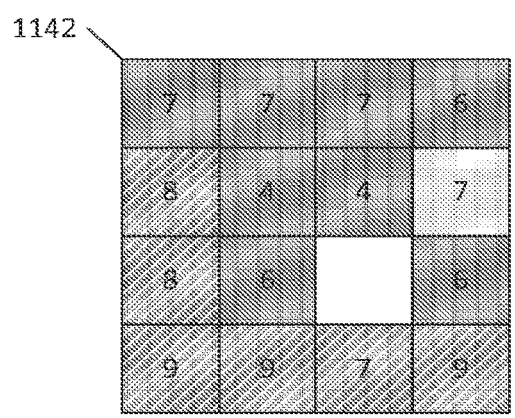
Figure 11D:
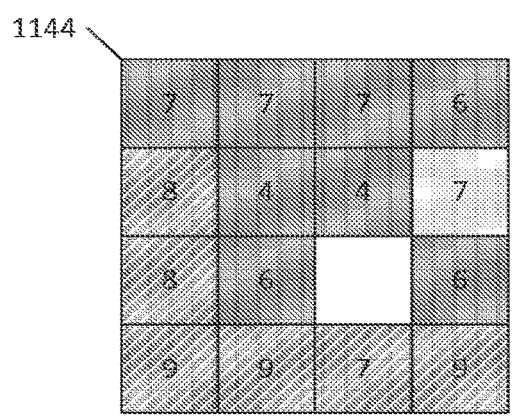
Figure 11E:
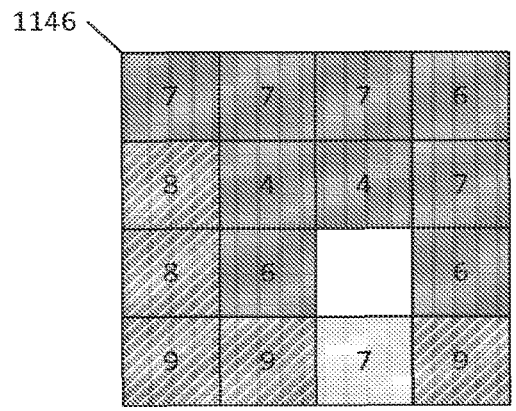
Figure 11E:
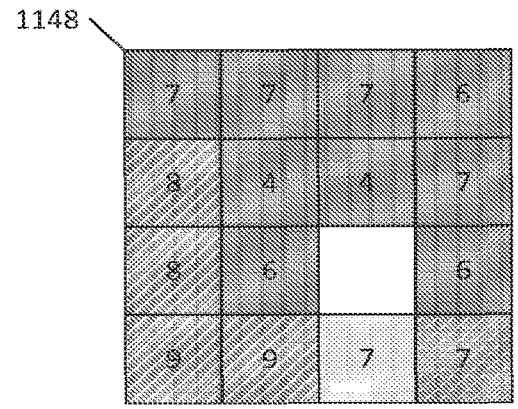
Figure 11E:
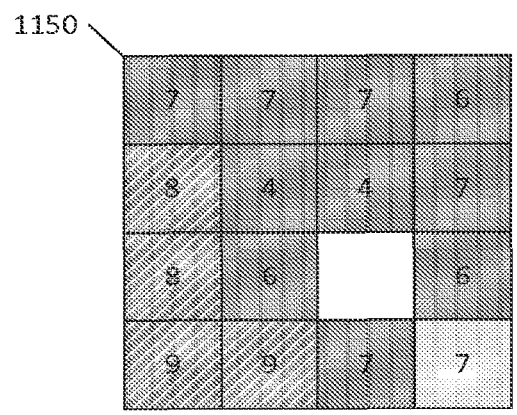
Figure 11E:
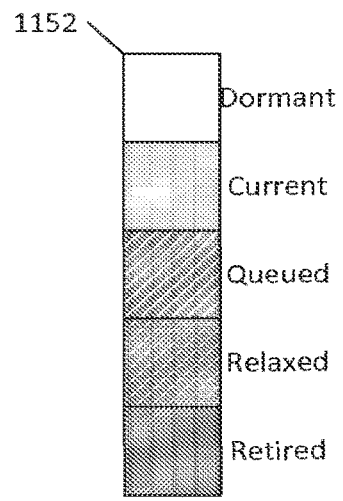
Figure 11E:
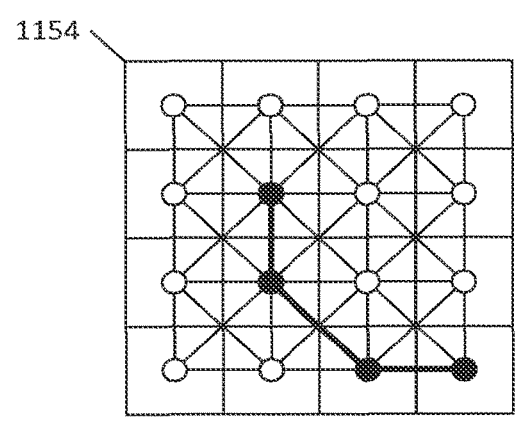

FIG. 10 illustrates the Route Generator 104 of the exemplary embodiment for generating routes that minimize the path's intervisibility union while meeting speed constraints by avoiding slow terrain, The Route Generator 104 begins at step 1000 by retrieving the graph as input. At step 1002, the Route Generator 104 retrieves the cost grid from the Map Database 110. The Route Generator 104 then executes the A* algorithm 1004, which finds an optimal path from a start node to an end node. The Route Generator 104 assumes the nodes of the graph 1000 are pre-initialized for use in the A* algorithm 1004. The A* algorithm 1004 is well known to those skilled in the art, and can be performed, for example, using -Artificial Intelligence, Third Edition" by Patrick Henry Winston, published by Addison-Wesley, which is incorporated by reference herein. Initialization of a graph's nodes for use in the A* algorithm 1004 is also well-known to those skilled in the art and can be performed, for example, using chapter 5 of the book "Artificial Intelligence, Third Edition" by Patrick Henry Winston, published by Addison-Wesley.

The Route Generator 104 necessitates inclusion of a union field in each node that stores a union of one or more viewsheds. The Route Generator 104 computes and maintains each node's union field in the same manner as each node's key field is normally computed and maintained. Throughout, a node's union field represents the set union of the viewsheds of the nodes in the path leading up to the node, and a node's key field represents the cardinality of the node's union (i.e., the number of nodes in the union). It follows that initialization of the union field for use in the A* algorithm 1004 requires setting the start node's union field to the start node's viewshed from the Intervisibility Database 108, the start node's key field to the cardinality of the start node's union field, and the union and key fields for all other nodes to null and zero respectively. It also follows that in the step where the A* algorithm 1004 relaxes a node, both the node's key and union fields are relaxed as well. In the step where the A* algorithm 1004 considers adjacent nodes, the Route Generator 104 will ignore adjacent nodes having infinite cost as indicated by the cost grid contained in the Map Database 110. The effect of this modification is that the Route Generator 104 does not include nodes with infinite cost in the optimal path, thereby ensuring that the traversal speeds of each node in the optimal path meets or exceeds a threshold value. It is realized that this modification may cause the Route Generator 104 to report that no route exists. However, alternate exemplary embodiments of the Route Generator 104 may allow nodes having infinite cost into the minimum priority queue, facilitating route generation at the expense of breaking below the speed threshold if no other route exists. At step 1006, the A* algorithm 1004 calculates the cost from the current node in consideration to the adjacent node in consideration, but substitutes use of the Cost Evaluator 1006 to obtain the cost. The Cost Evaluator 1006 computes the key and union fields for adjacent nodes as well as an estimate used for ordering nodes in the minimum priority queue. At step 1008, the Route Generator 104 returns the tactical route.

To better understand the Route Generator 104 of the exemplary embodiment for generating routes that minimize the path's intervisibility union while meeting speed constraints by avoiding slow terrain, consider the example in FIG. 11. First, the Route Generator 104 begins by retrieving the graph 1100 as input, which specifies a start node 1106 and an end node 1108. The Route Generator 104 will generate the optimal path from the start node 1106 with label 7 at position (1,2) to the end node 1108 with label 13 at position (3,0). Next, the Route Generator 104 retrieves the cost grid 1102 from the Map Database 110. Next, the Route Generator 104 executes the A* algorithm 1004. In this step, the A* algorithm 1004 configures a node table 1104 and initializes the fields of each node in the table 1104. Next 1110, the A* algorithm 1004 begins by examining the start node 1106 with label 7. Next 1112, the cost of moving from node 7 to each of node 7's adjacent nodes is computed using the Cost Evaluator 1006. Since each of node 7's adjacent nodes are unvisited, all are added to the minimum priority queue, except node 10 which is ignored because it has infinite cost.

Next 1114, node 7 is retired and node II is extracted from the minimum priority queue. Next 1116, the cost of moving from node 11 to each of node 11's adjacent nodes is computed using the Cost Evaluator 1006. No nodes are relaxed, and some of node 11's adjacent nodes are added to the minimum priority queue.

Next 1118, node 11 is retired and node 6 is extracted from the minimum priority queue. Next 1120, the cost of moving from node 6 to each of node 6's adjacent nodes is computed using the Cost Evaluator 1006. No nodes are relaxed, and some of node 6's adjacent nodes are added to the minimum priority queue.

Next 1122, node 6 is retired and node 16 is extracted from the minimum priority queue. Next 1124, the cost of moving from node 16 to each of node 16's adjacent nodes is computed using the Cost Evaluator 1006. No nodes are relaxed, and none of node 16's adjacent nodes are added to the minimum priority queue.

Next 1126, node 16 is retired and node 14 is extracted from the minimum priority queue. Next 1128, the cost of moving from node 4 to each of node 14's adjacent nodes is computed using the Cost Evaluator 1006. No nodes are relaxed, and none of node 14's adjacent nodes are added to the minimum priority queue, including node 13, the end node. At this point, a path from the start node 1106 to the end node 1108 has been found: node 7 to 11 to 14 to 13, and the cost of this path is 9. However, since this may not be the optimal path, the algorithm continues searching.

Next 1130, node 14 is retired and node 4 is extracted from the minimum priority queue. Next 1132, the cost of moving from node 4 to each of node 4's adjacent nodes is computed using the Cost Evaluator 1006. No nodes are relaxed, and none of node 4's adjacent nodes are added to the minimum priority queue.

Next 1134, node 4 is retired and node 8 is extracted from the minimum priority queue. Next 1136, the cost of moving from node 8 to each of node 8's adjacent nodes is computed using the Cost Evaluator 1006. No nodes are relaxed, and none of node 8's adjacent nodes are added to the minimum priority queue, Next 1138, node 8 is retired and node 12 is extracted from the minimum priority queue. Next 1140, the cost of moving from node 12 to each of node 12's adjacent nodes is computed using the Cost Evaluator 1006. No nodes are relaxed, and none of node 12's adjacent nodes are added to the minimum priority queue.

Next 1142, node 12 is retired and node 15 is extracted from the minimum priority queue. Next 1144, the cost of moving from node 15 to each of node 15's adjacent nodes is computed using the Cost Evaluator 1006. No nodes are relaxed, and none of node 15's adjacent nodes are added to the minimum priority queue.

Next 1146, node 15 is retired and node 9 is extracted from the minimum priority queue. Next 1148, the cost of moving from node 9 to each of node 9's adjacent nodes is computed using the Cost Evaluator 1006. Node 13 is relaxed from a cost of 9 to a cost of 7, and none of node 9's adjacent nodes are added to the minimum priority queue.

Next 1150, node 9 is retired and node 13 is extracted from the minimum priority queue. Since node 13 was extracted from the queue, the optimal path from start to end has been found and node evaluation terminates. Next, the optimal path 1154 is constructed by following parent pointers starting at node 13. The optimal path 1154 is found to be node 7 to 6 to 9 to 13 with a cost of 7. The optimal path also meets the speed constraint by avoiding use of node 10, the only node with infinite cost in the graph. The Route Generator 104 then terminates by returning the optimal path.

Figure 12:
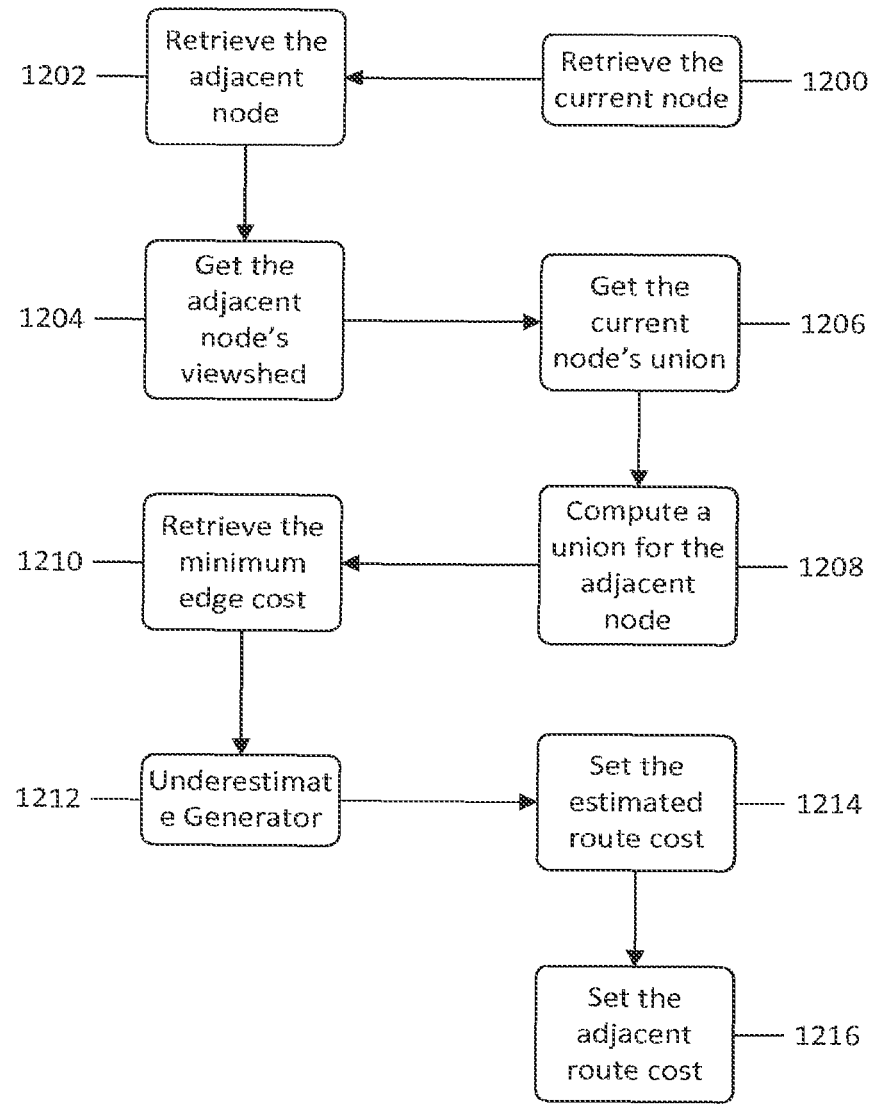
FIG. 12 illustrates a Cost Evaluator.

FIG. 12 illustrates the Cost Evaluator 1006 of the exemplary embodiment for generating routes that minimize the path's intervisibility union while meeting speed constraints by avoiding slow terrain. The Cost Evaluator 1006 begins at step 1200 by retrieving the current node as input. At step 1202, the Cost Evaluator 1006 retrieves the adjacent node as input. At step 1204, the Cost Evaluator 1006 queries the Intervisibility Database 108 for the viewshed V of the adjacent node using the adjacent node's coordinates. At step 1206, the Cost Evaluator 1006 obtains the current union Ucurrent stored in the current node's union field. At step 1208, the Cost Evaluator 1006 calculates the adjacent union Uadjacent as the union of V and Ucurrent as follows:

$$U\text{adjacent} = V \cup U\text{current}$$

At step 1210, the Cost Evaluator 1006 retrieves the minimum edge cost as input. At step 1212, the Cost Evaluator 1006 calls the Underestimate Generator 1212 to determine an estimate E of the cardinality of the union of the best path from the adjacent node to the end node. The Underestimate Generator 1212 uses the diagonal distance heuristic, which measures distance accumulated by traveling along both axial and diagonal edges in a graph. The diagonal distance heuristic can be computed using, for example, "An optimal pathfinder for vehicles in real-world digital terrain maps", at www.student.nada.kth.se/-f93-maj/pathfinder/4.html#1, and incorporated by reference herein. The Underestimate Generator 1212 then multiplies the result of the optimal distance heuristic by the minimum edge cost to obtain the estimate E as follows:

$$E = \text{minimum edge cost } 1308 * \text{Distance estimate}$$

Those skilled in the art are familiar with the methods used for generating underestimates, namely finding the minimum edge cost in the graph and multiplying it by an underestimate of the distance from the adjacent node to the end node. As such, the Underestimate Generator 1212 will not be described any further herein. Instead, please refer to U.S. Pat. No. 6,963,800 to Milbert, which is incorporated herein by reference. At step 1214, the Cost Evaluator 1006 sets the estimated route cost Restimated of the adjacent node by summing the result of the Underestimate Generator 1212 and the cardinality of Uadjacent, |Uadjacent|, as follows:

$$R\text{estimated} = E + |U\text{adjacent}|$$

At step 1216, the Cost Evaluator 1006 sets the adjacent route cost Radjacent of the adjacent node to Uadjacent's cardinality as follows:

$$R\text{adjacent} = |U\text{adjacent}|$$

After step 1216, the Cost Evaluator 1006 terminates.

To better understand the Cost Evaluator 1006 of the exemplary embodiment for generating routes that minimize the path's intervisibility union while meeting speed constraints by avoiding slow terrain, consider the example in FIG. 13. The Cost Evaluator 1006 retrieves the current node 1300 with label 7 at position (1,2) from the Route Generator 104. Next, the Cost Evaluator 1006 retrieves the adjacent node 1302 with label 3 at position (0,2). Next, the Cost Evaluator 1006 queries the Intervisibility Database 108 for the viewshed 1304 V of the adjacent node 1302 with label 3 at position (0,2). The Intervisibility Database 108 indicates that the viewshed 1304 of the adjacent node 1302 with label 3 at position (0.2) is {(0,3). (1,3), (0,2), (0,1)). Next, the Cost Evaluator 1006 obtains the union 1306 Ucurrent of the current node 1300. In this example, Ucurrent=1(2,3), (1,2), (2,2), (1,1)}. Next, the Cost Evaluator 1006 computes the adjacent union Uadjacent as follows:

$$U\text{adjacent} = V \cup U\text{current} = 1(2, 3), (1, 2), (2, 2), (1, 1)1 \cup 1(0, 3), (1, 3),$$
$$(0, 2), (0, 1)1 = \{(2, 3), (1, 2), (2, 2), (1, 1), (0, 3), (1, 3), (0, 2), (0, 1)\}$$

Next, the Cost Evaluator 1006 retrieves the minimum edge cost 1308 as input. In this example, the minimum edge cost 1308 is 0. Next, the Cost Evaluator 1006 calls the Underestimate Generator to determine an estimate E. In this example, the Underestimate Generator computes E as follows:

$$E = \text{minimum edge cost } 1308 * \text{Distance estimate} = 0 * \text{Distance estimate} = 0$$

Next, the Cost Evaluator 1006 computes the estimated route cost Restimated using E and the cardinality of Uadjacent as follows:

$$R\text{estimated} = E + |U\text{adjacent}| = 0 + 8 =$$

Finally, the Cost Evaluator 1006 computes the adjacent route cost Radjacent as follows:

$$R\text{adjacent} = |U\text{adjacent}| = 8$$

Another exemplary embodiment for generating tactical routes is one that maximizes the path's intervisibility union while meeting speed constraints by avoiding slow terrain. By maximizing the path's intervisibility union, travelers are exposed to a maximal amount of previously-unexposed terrain after beginning travel, thereby allowing travelers to exert a surveillance or weapons capability advantage (e.g., range) over enemies in unexposed terrain. By avoiding slow terrain below an arbitrary threshold, travelers can travel at or above the speed threshold at every node on the path, rendering it difficult for enemies to engage the traveler in combat.

This exemplary embodiment for generating routes that maximize the path's intervisibility union while meeting speed constraints by avoiding slow terrain defines explicitly-different behavior for only the Cost Evaluator 1006 component, and implicitly-different behavior for the Route Generator 104 component. Also, this exemplary embodiment relies on using inverses of cost values representing union cardinality. A variation on this exemplary embodiment may, instead of taking inverse cost values representing union cardinality, utilize a maximum priority queue far selecting nodes in the A* algorithm 1004. Such an exemplary embodiment would likely have to abandon using infinite costs to represent slow terrain. Yet another variation on this exemplary embodiment may cease node evaluation after each node adjacent to the end node has been retired. Although such an exemplary embodiment may be unobvious because it is not widely employed in the art, it may reduce the running time of the Route Generator 104 because wasted computation would be avoided.

To illustrate the behavior of the Cost Evaluator 1006 of the exemplary embodiment for generating routes that maximize the path's intervisibility union while meeting speed constraints by avoiding slow terrain, refer to FIG. 12. At step 1214, the Cost Evaluator 1006 sets the estimated route cost Restimated of the adjacent node by taking the inverse of the sum of the result of the Underestimate Generator 1212 and the cardinality of Uadjacent, |Uadjacent|, as follows:

Restimated=1/(E|Uadjacent|)

At step 1216, the Cost Evaluator 1006 sets the adjacent route cost Radjacent of the adjacent node to the inverse of Uadjacent's cardinality as follows:

Radjacent=1/|Uadjacent|

Figure 14:
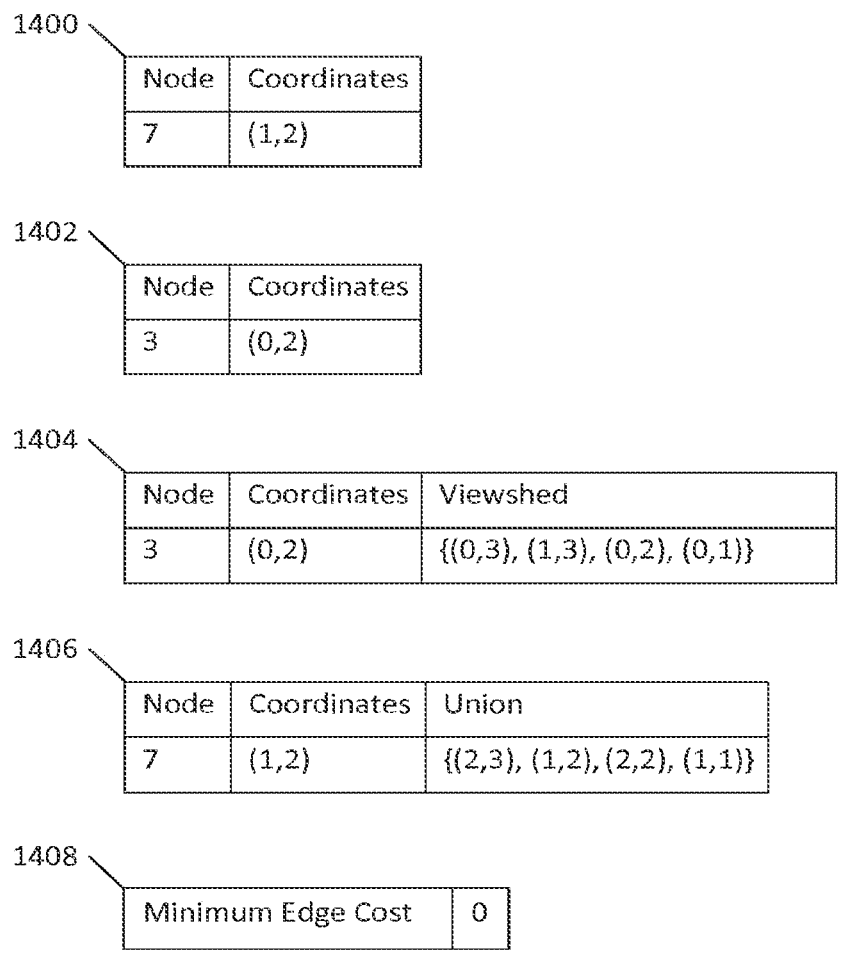
FIG. 14 illustrates a second Cost Evaluator Example.
Figure 15A:
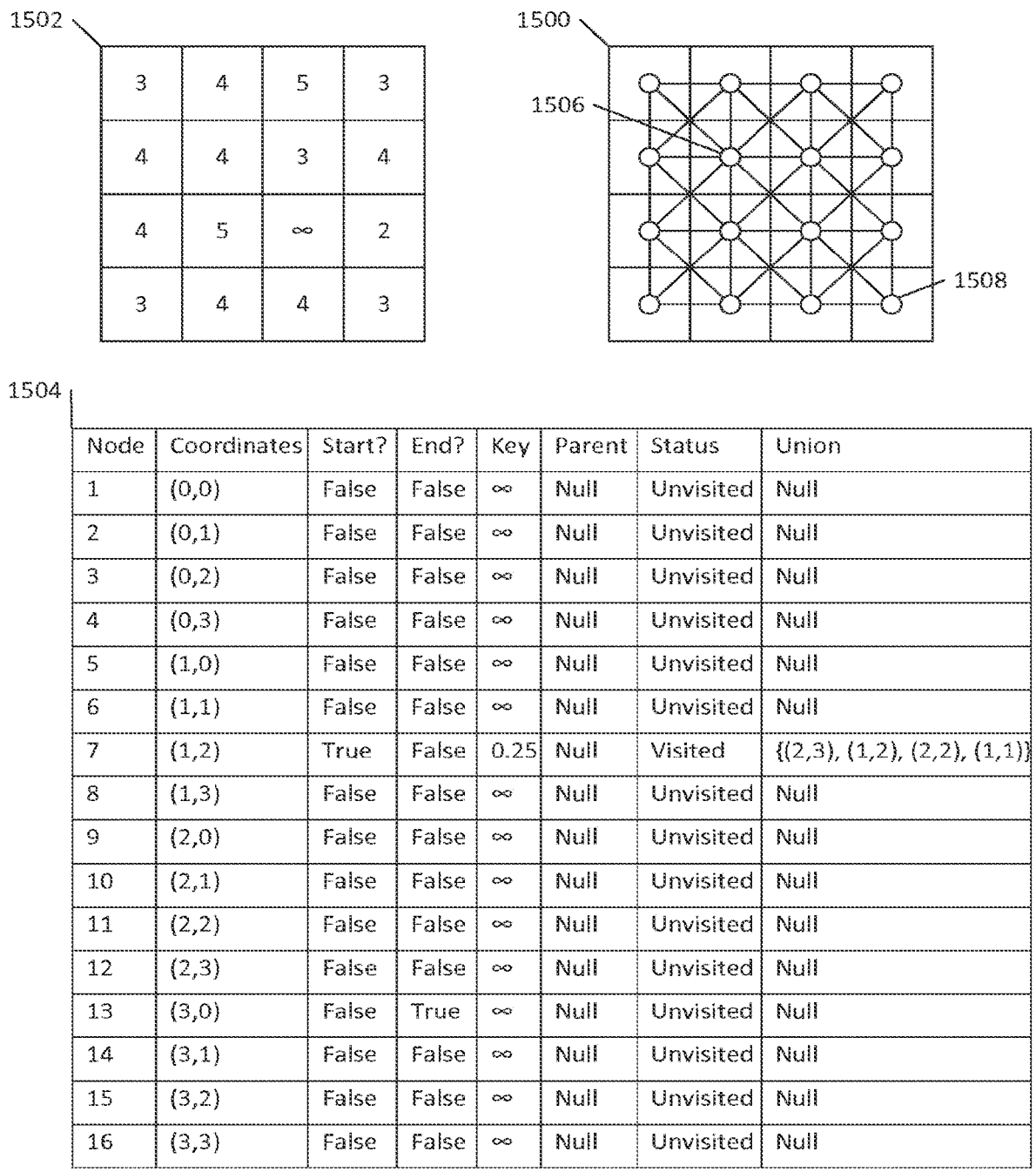
Figure 15E:
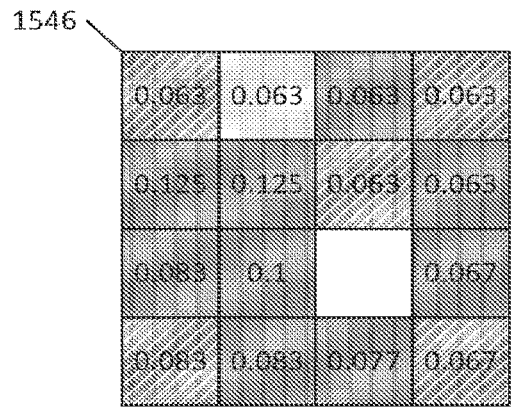
Figure 15E:
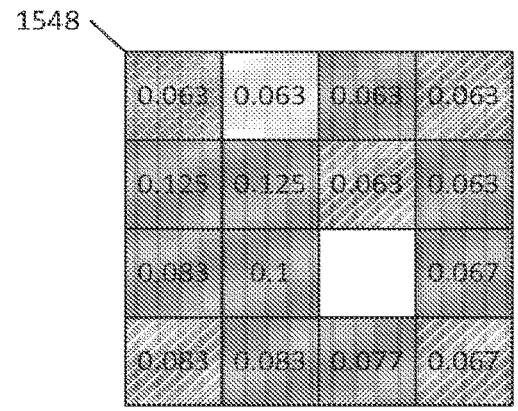
Figure 15E:
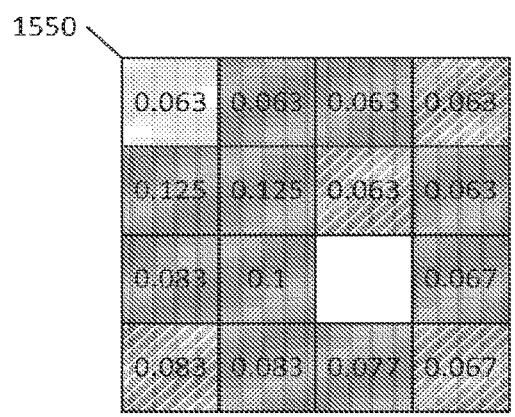
Figure 15E:
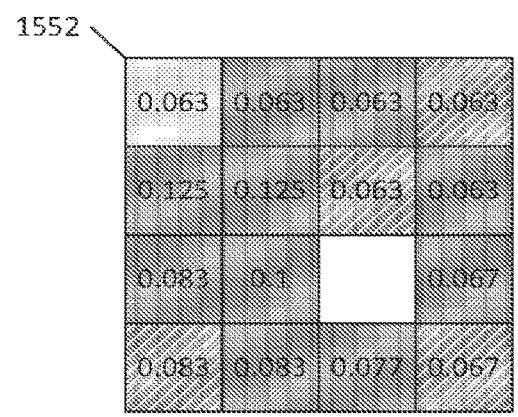
Figure 15E:
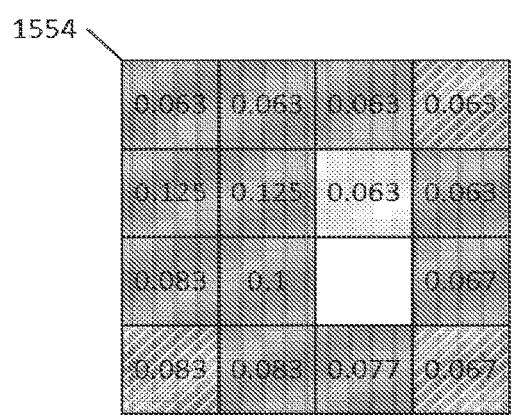
Figure 15E:
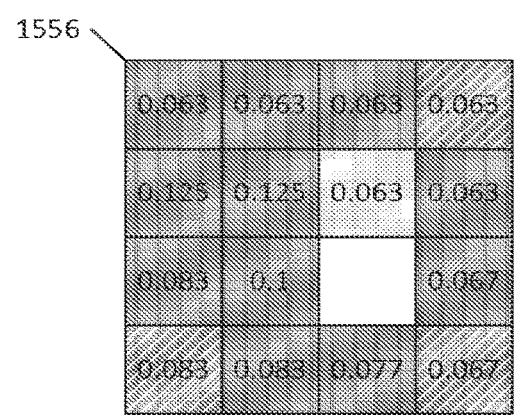
Figure 15F:
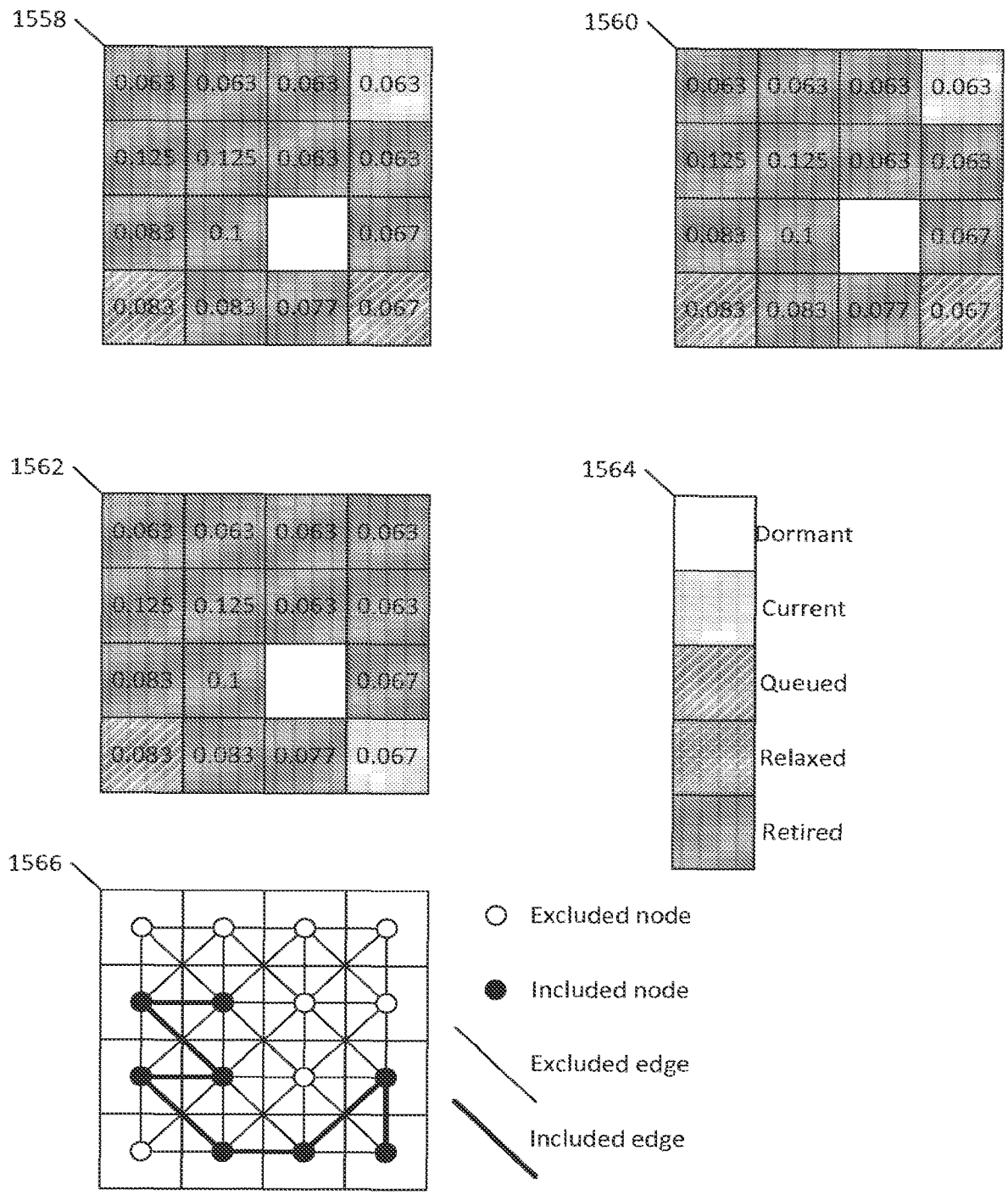

To better understand the Cost Evaluator 1006 of the exemplary embodiment for generating routes that maximize the path's intervisibility union while meeting speed constraints by avoiding slow terrain, consider the example in FIG. 14. The Cost Evaluator 1006 retrieves the current node 1400 with label 7 at position (1,2) from the Route Generator 104. Next, the Cost Evaluator 1006 retrieves the adjacent node 1402 with label 3 at position (0,2). Next, the Cost Evaluator 1006 queries the Intervisibility Database 108 for the viewshed 1404 V of the adjacent node 1402 with label 3 at position (0,2). The Intervisibility Database 108 indicates that the viewshed 1404 of the adjacent node 1402 with label 3 at position (0,2) is {(0,3), (1,3), (0,2), (0,1)}. Next, the Cost Evaluator 1006 obtains the union 1406 Ucurrent of the current node 1400. In this example, Ucurrent={(2,3), (1,2), (2,2), (1,1)} Next, the Cost Evaluator 1006 computes the adjacent union Uadjacent as follows:

Uadjacent=V U Ulcurrent={(2,3),(1,2),(2.2),(1,1))U{
(0,3),(1,3),(0,2),(0,1)}={(2,3),(1,2),(2,2),(1,1),(0,
3),(1,3),(0,2),(0,1)1

Next, the Cost Evaluator 1006 retrieves the minimum edge cost 1408 as input. In this example, the minimum edge cost 1408 is 0. Next, the Cost Evaluator 1006 calls the Underestimate Generator to determine an estimate E. In this example, the Underestimate Generator computes E as follows:

E=minimum edge cost 1408*Distance
estimate=0*Distance estimate=0

Next, the Cost Evaluator 1006 computes the estimated route cost Restimated using E and the cardinality of Uadjacent as follows:

Restimated=1/(E+|Uadjacent|)=1/(0+8)=1/8–0.125

Finally, the Cost Evaluator 1006 computes the adjacent route cost Radjacent as follows:

Radjacent=1/|Uadjacent|=1/8=0.125

To better understand how the changes to the Cost Evaluator 1006 of the exemplary embodiment for generating routes that maximize the path's intervisibility union while meeting speed constraints by avoiding slow terrain affect the behavior of the Route Generator 104 of the same exemplary embodiment, consider the example in FIG. 15. First, the Route Generator 104 begins by retrieving the graph 1500 as input, which specifies a start node 1506 and an end node 1508. The Route Generator 104 will generate the optimal path from the start node 1506 with label 7 at position (1,2) to the end node 1508 with label 13 at position (3,0). Next, the Route Generator 104 retrieves the cost grid 1502 from the Map Database 110. Next, the Route Generator 104 executes the A* algorithm 1004. In this step, the A* algorithm 1004 configures a node table 1504 and initializes the fields of each node in the table 1504. Next 1510, the A* algorithm 1004 begins by examining the start node 1506 with label 7. Next 1512, the cost of moving from node 7 to each of node 7's adjacent nodes is computed using the Cost Evaluator 1006. Since each of node 7's adjacent nodes are unvisited, all are added to the minimum priority queue, except node 10 which is ignored because it has infinite cost.

Next 1514. node 7 is retired and node 3 is extracted from the minimum priority queue. Next 1516, the cost of moving from node 3 to each of node 3's adjacent nodes is computed using the Cost Evaluator 1006. Nodes 2, 4, 6, and 8 are relaxed, and none of node 3's adjacent nodes are added to the minimum priority queue.

Next 1518, node 3 is retired and node 6 is extracted from the minimum priority queue. Next 1520, the cost of moving from node 6 to each of node 6's adjacent nodes is computed using the Cost Evaluator 1006. Nodes 2 and 11 are relaxed, and some of node 6's adjacent nodes are added to the minimum priority queue.

Next 1522, node 6 is retired and node 2 is extracted from the minimum priority queue. Next 1524, the cost of moving from node 2 to each of node 2's adjacent nodes is computed using the Cost Evaluator 1006. No nodes are relaxed, and none of node 2's adjacent nodes are added to the minimum priority queue.

Next 1526, node 2 is retired and node 5 is extracted from the minimum priority queue. Next 1528, the cost of moving from node 5 to each of node 5's adjacent nodes is computed using the Cost Evaluator 1006. Node 9 is relaxed, and none of node 5's adjacent nodes are added to the minimum priority queue.

Next 1530, node 5 is retired and node 9 is extracted from the minimum priority queue. Next 1532, the cost of moving from node 9 to each of node 9's adjacent nodes is computed using the Cost Evaluator 1006. No nodes are relaxed, and none of node 9's adjacent nodes are added to the minimum priority queue.

Next 1534, node 9 is retired and node 14 is extracted from the minimum priority queue. Next 1536, the cost of moving from node 14 to each of node 14's adjacent nodes is computed using the Cost Evaluator 1006. Nodes 11 and 13 are relaxed, and some of node 14's adjacent nodes are added to the minimum priority queue.

Next 1538, node 14 is retired and node 15 is extracted from the minimum priority queue. Next 1540, the cost of moving from node 15 to each of node 15's adjacent nodes is computed using the Cost Evaluator 1006. Nodes 11 and 12 are relaxed, and some of node 15's adjacent nodes are added to the minimum priority queue.

Next 1542, node 15 is retired and node 12 is extracted from the minimum priority queue. Next 1544, the cost of moving from node 12 to each of node 12's adjacent nodes is computed using the Cost Evaluator 1006. Node 8 is relaxed, and none of node 12's adjacent nodes are added to the minimum priority queue.

Next 1546, node 12 is retired and node 8 is extracted from the minimum priority queue. Next 1548, the cost of moving from node 8 to each of node 8's adjacent nodes is computed using the Cost Evaluator 1006. Node 4 is relaxed, and none of node 8's adjacent nodes are added to the minimum priority queue.

Next 1550, node 8 is retired and node 4 is extracted from the minimum priority queue. Next 1552, the cost of moving from node 4 to each of node 4's adjacent nodes is computed using the Cost Evaluator 1006. No nodes are relaxed, and none of node 4's adjacent nodes are added to the minimum priority queue.

Next 1554, node 4 is retired and node 11 is extracted from the minimum priority queue. Next 1556, the cost of moving from node 11 to each of node 11's adjacent nodes is computed using the Cost Evaluator 1006. No nodes are relaxed, and none of node 11's adjacent nodes are added to the minimum priority queue.

Next 1558, node 11 is retired and node 16 is extracted from the minimum priority queue. Next 1560, the cost of moving from node 16 to each of node 16's adjacent nodes is computed using the Cost Evaluator 1006. No nodes are relaxed, and none of node 16's adjacent nodes are added to the minimum priority queue.

Next 1562, node 16 is retired and node 13 is extracted from the minimum priority queue. Since node 13 was extracted from the queue, the optimal path from start to end has been found and node evaluation terminates. Next, the optimal path 1566 is constructed by following parent pointers starting at node 13. The optimal path 1566 is found to be node 7 to 3 to 6 to 2 to 5 to 9 to 14 to 13 with a cost of 0.067 (approximating ⅟₁₅). The optimal path also meets the speed constraint by avoiding use of node 10, the only node with infinite cost in the graph. The Route Generator 104 then terminates by returning the optimal path. In the exemplary embodiment for generating routes that maximize the path's intervisibility union while meeting speed constraints by avoiding slow terrain, the Route Generator 104 produces the path having the maximum visibility union per distance travelled. In other words, the ratio of the cardinality of the path's union to the number of edges in the route is the maximum for any possible route. In this particular example, the Route Generator 104 produced a route with a visibility union size of 15 grid cells using only 7 edges, yielding a ratio of union size to distance traveled of 15/7=2.143, the highest such ratio for any possible route in this example.

Another exemplary embodiment for generating tactical routes is one that minimizes the path's intervisibility sum while meeting speed constraints by avoiding slow terrain. By minimizing the path's intervisibility sum, travelers are exposed to a minimal amount of terrain after beginning travel, thereby reducing the risk of encountering enemies in unexposed terrain. By avoiding slow terrain below an arbitrary threshold, travelers can travel at or above the speed threshold at every node on the path, rendering it difficult for enemies to engage the traveler in combat. This exemplary embodiment omits use of the Minimum Edge Cost Finder 102 and the Cost Evaluator 1006 and modifies the behavior of the Cost Generator 100 of the exemplary embodiment for generating routes that maximize the path's intervisibility union.

Figure 16A:
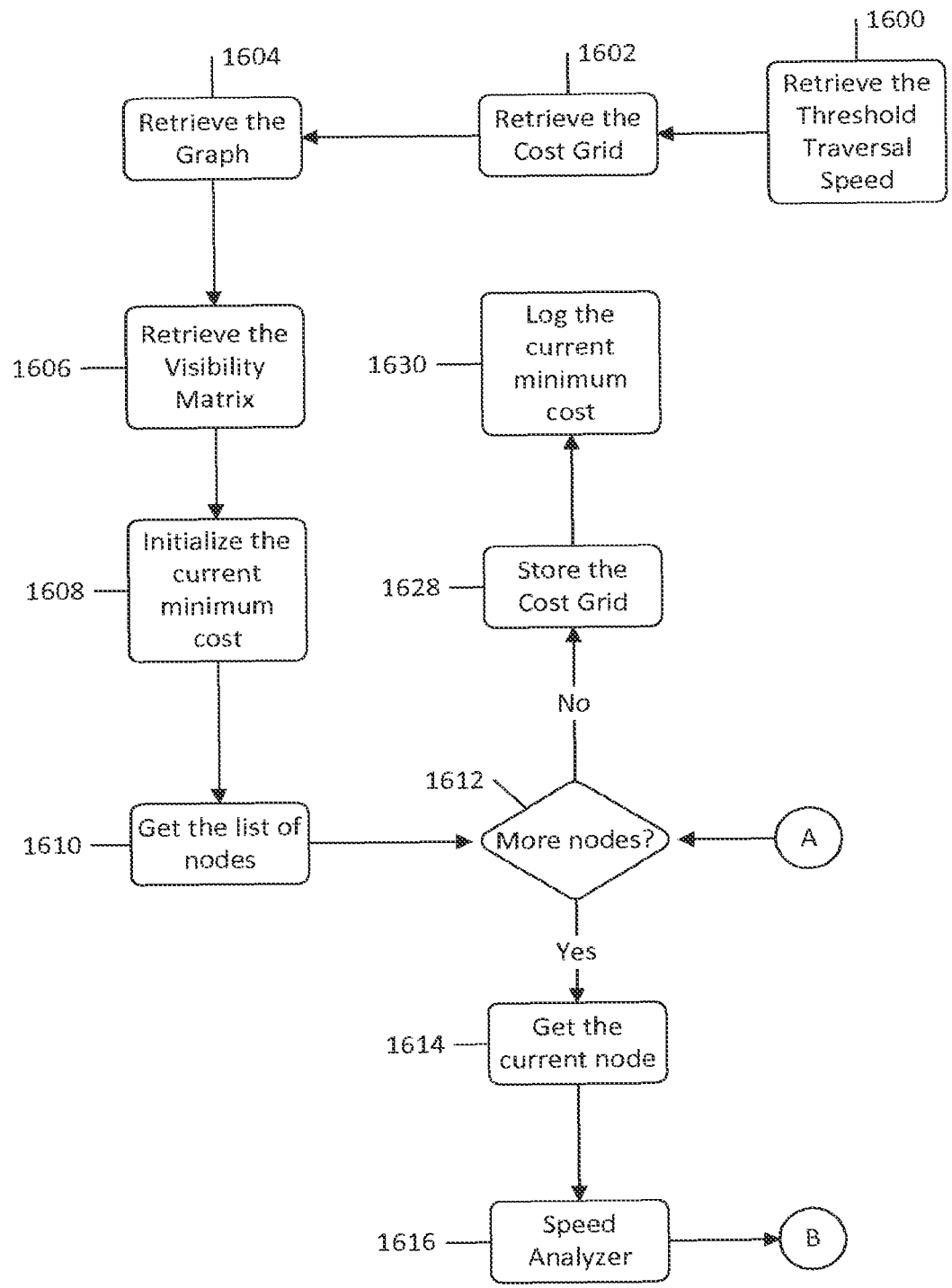
FIGS. 16A&B illustrate a second Cost Generator.
Figure 16B:
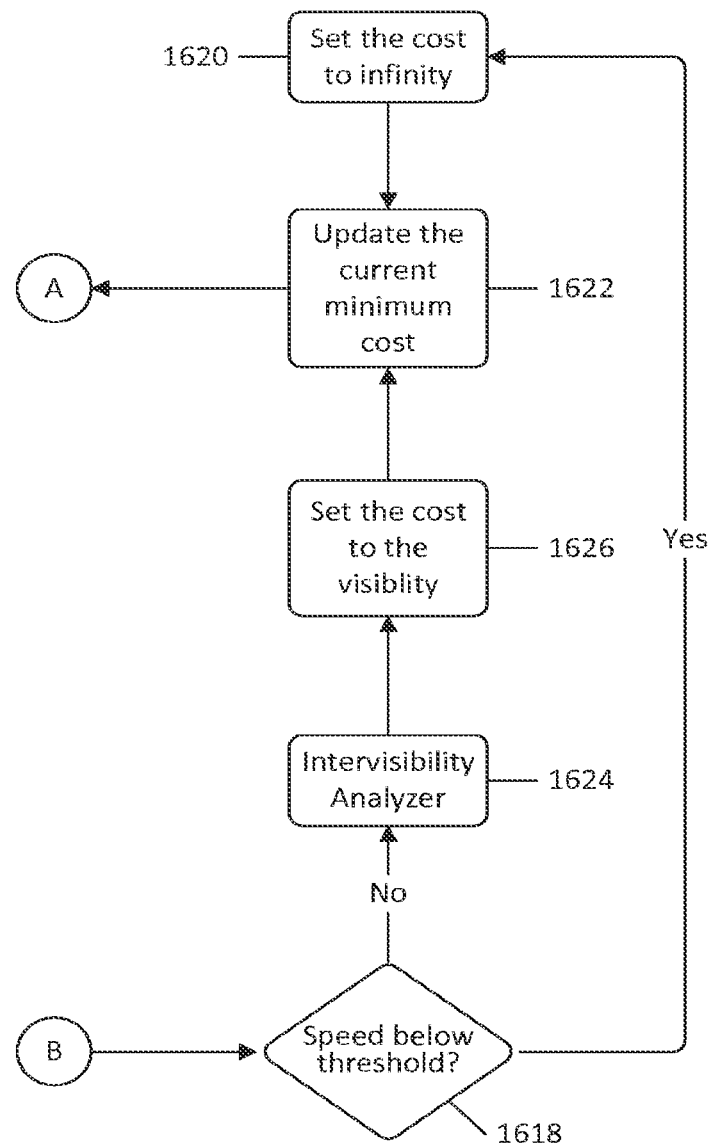

FIG. 16 illustrates the Cost Generator 100 of the exemplary embodiment for generating routes that minimize the path's intervisibility sum while meeting speed constraints by avoiding slow terrain. The Cost Generator 100 begins at step 1600 by retrieving the threshold traversal speed from the Capabilities Database 106. At step 1602, the Cost Generator 100 retrieves the cost grid from the Map Database 110. At step 1604, the Cost Generator 100 retrieves the graph from the Map Database 110. At step 1606, the Cost Generator 100 retrieves the visibility matrix from the Intervisibility Database 108. At step 1608, the Cost Generator 100 sets the current minimum edge cost C to the maximum cardinality indicated by the visibility matrix. At step 1610, the Cost Generator 100 obtains the list of nodes from the graph. At step 1612, the Cost Generator 100 determines if there are more nodes to evaluate. If not, at step 1628, the Cost Generator 100 stores the now-populated cost grid back to the Map Database 110. If so, at step 1614, the Cost Generator 100 gets the current node and proceeds to step 1616.

At step 1616, the Cost Generator 100 obtains the node's speed by passing the node to the Speed Analyzer 212. At step 1618, the Cost Generator 100 determines whether the node's speed is below the threshold traversal speed. If so, at step 1620, the Cost Generator 100 sets the current node cost N in the corresponding cell in the cost grid to infinity to indicate the node is impassable and proceeds to step 1622. If not, at step 1624, the Cost Generator 100 obtains the current node's viewshed V by passing the node to the Intervisibility Analyzer 216 and proceeds to step 1626. At step 1626, the Cost Generator 100 sets the current node cost N in the corresponding cell in the cost grid to the cardinality of V, |V|. At step 1622, the Cost Generator 100 updates C to the smaller of C and the current node cost N, as indicated by the following formula:

$$C=\mathrm{Minimum}(N,C)$$

After step 1626, the Cost Generator 100 continues evaluating nodes by proceeding to step 1612. At step 1628, the Cost Generator 100 stores the cost grid. At step 1630, the Cost Generator 100 logs the current minimum cost C. Upon termination after step 1630, the Cost Generator 100 will have set the cost of each node's corresponding cell in the cost grid in the Map Database 110.

Another exemplary embodiment for generating tactical routes is one that maximizes the path's intervisibility sum while meeting speed constraints by avoiding slow terrain. By maximizing the path's intervisibility sum, travelers are exposed to a maximal amount of previously-unexposed terrain after beginning travel, thereby allowing travelers to exert a surveillance or weapons capability advantage (e.g., range) over enemies in unexposed terrain. By avoiding slow terrain below an arbitrary threshold, travelers can travel at or above the speed threshold at every node on the path, rendering it difficult for enemies to engage the traveler in combat.

The Cost Generator 100 of this exemplary embodiment that maximizes the path's intervisibility sum differs from that of the exemplary embodiment that minimizes the path's intervisibility sum in two steps; first, at step 1608, the Cost Generator 100 sets the current minimum edge cost C to I. Second, at step 1626, the Cost Generator 100 sets the current node cost N in the corresponding cell in the cost grid to the inverse of the cardinality of V, NI, using the following formula:

$$N=1/|V|$$

Other steps of the Cost Generator 100 of this exemplary embodiment that maximizes the path's intervisibility sum remain the same as those described in the exemplary embodiment that minimizes the path's intervisibility sum.

The above-described devices and subsystems of the exemplary embodiments of FIGS. 1-16 can include, for example, any suitable servers, workstations, PCs, laptop computers, PDAs, Internet appliances, handheld devices, cellular telephones, wireless devices, other electronic devices, and the like, capable of performing the processes of the exemplary embodiments of FIGS. 1-16. The devices and subsystems of the exemplary embodiments of FIGS. 1-16 can communicate with each other using any suitable protocol and can be implemented using one or more programmed computer systems or devices.

One or more interface mechanisms can be used with the exemplary embodiments of FIGS. 1-16, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMax Networks, a combination thereof, and the like.

It is to be understood that the devices and subsystems of the exemplary embodiments of FIGS. 1-16 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-16 can be implemented via one or more programmed computer systems or devices.

To implement such variations as well as other variations, a single computer system can be programmed to perform the special purpose functions of one or more of the devices and subsystems of the exemplary embodiments of FIGS. 1-16. On the other hand, two or more programmed computer systems or devices can be substituted for any one of the devices and subsystems of the exemplary embodiments of FIGS. 1-16. Accordingly, principles and advantages of distributed processing, such as redundancy, replication, and the like, also can be implemented, as desired, to increase the robustness and performance the devices and subsystems of the exemplary embodiments of FIGS. 1-16.

The devices and subsystems of the exemplary embodiments of FIGS. 1-16 can store information relating to various processes described herein. This information can be stored in one or more memories, such as a hard disk, optical disk, magneto-optical disk, RAM, and the like, of the devices and subsystems of the exemplary embodiments of FIGS. 1-16. One or more databases of the devices and subsystems of the exemplary embodiments of FIGS. 1-16 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-16 can include appropriate data structures for storing data collected and/or generated by the processes of the devices and subsystems of the exemplary embodiments of FIGS. 1-16 in one or more databases thereof.

All or a portion of the devices and subsystems of the exemplary embodiments of FIGS. 1-16 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-16 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-16, for driving the devices and subsystems of the exemplary embodiments of FIGS. 1-16, for enabling the devices and subsystems of the exemplary embodiments of FIGS. 1-16 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-16. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-16 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD. any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

Although the exemplary embodiments are described in terms of military applications, the teachings of the exemplary embodiments can be used with any suitable non-military applications, as will be appreciated by those skilled in the relevant art(s).

While the present invention have been described in connection with a number of exemplary embodiments and implementations, the present invention is not so limited, but rather covers various modifications and equivalent arrangements, which fall within the purview of the appended claims.

What is claimed is:

1. A system for generating tactical routes, the system comprising:
a global positioning system having an input operable to receive user input to place one or more waypoints; the global positioning system further including a system for generating at least one additional waypoint at least partially responsive to the waypoint placed based on the received user input, the system for generating at least one additional waypoint including:
an intervisibility database pre-populated with pre-computed optical lines of sight between locations or nodes in geographic terrain;
an intervisibility analyzer for analyzing propagation of optical lines of sight between locations or nodes in geographic terrain, including generating a viewshed for each node using a position of each node, the viewshed including a set whose elements comprise other nodes having an optical line of sight to each node, and counting the number of the elements in the viewshed to determine a cardinality size of the viewshed as the visibility of each node for quantifying an extent to which a traveler is exposed when traveling across terrain represented by each node;
a speed analyzer for analyzing speeds of travelers across the locations or nodes in the geographic terrain, including retrieving a land cover map and traversal matrix, querying the land cover map for a terrain type for each node using a position of each node, returning a speed of the terrain type found in the traversal matrix representing how fast the traveler can travel across terrain represented by each of the nodes;
a cost generator for generating a blended cost grid using said intervisibility and speed analyses;
a minimum edge cost finder for generating a minimum cost edge using said blended cost grid and configured for searching edges of a graph to find the minimum cost edge used for computing heuristics, the minimum cost edge being the edge with a minimum blended cost between any two adjacent nodes in the graph; and
a route generator for generating routes that facilitate tactical movement based on said blended cost grid and computed heuristics.

2. The system of claim 1, wherein said route generator is further configured for meeting a speed constraint, and further configured for at least one of:
computing intervisibility sums;
computing intervisibility unions;
minimizing intervisibility sums;
minimizing intervisibility unions;
maximizing intervisibility sums per distance traveled; and
maximizing intervisibility unions per distance traveled.

3. The system of claim 1, wherein said route generator is further configured for avoiding slow areas, and further configured for at least one of:
computing intervisibility sums;
computing intervisibility unions;
minimizing intervisibility sums;
minimizing intervisibility unions;
maximizing intervisibility sums per distance traveled; and
maximizing intervisibility unions per distance traveled.

4. A system for generating tactical routes, the system comprising:
a global positioning system having an input operable to receive user input to place one or more waypoints; the global positioning system further including a system for generating at least one additional waypoint at least partially responsive to the waypoint placed based on the received user input, the system for generating at least one additional waypoint including:
an intervisibility database pre-populated with pre-computed optical lines of sight between locations or nodes in geographic terrain;
an intervisibility analyzer for analyzing propagation of the pre-computed optical lines of sight between the locations or nodes in the geographic terrain;
a speed analyzer for analyzing speeds of travelers across the locations or nodes in the geographic terrain;
a cost generator for generating a blended cost grid using said intervisibility and speed analyses; and
a route generator for generating routes that facilitate tactical movement based on said blended cost grid, the route generator computing intervisibility unions at the locations or nodes in the geographic terrain and minimizing intervisibility unions along the generated route.

5. The system of claim 4, wherein said route generator is further configured for meeting a speed constraint, and further configured for at least one of:
computing intervisibility sums;
minimizing intervisibility sums;
maximizing intervisibility sums per distance traveled; and
maximizing intervisibility unions per distance traveled.

6. The system of claim 4, wherein said route generator is further configured for avoiding slow areas, and further configured for at least one of:
computing intervisibility sums;
minimizing intervisibility sums;
maximizing intervisibility sums per distance traveled; and
maximizing intervisibility unions per distance traveled.

7. The system of claim 4, further comprising:
the intervisibility analyzer configured for generating a viewshed for each node using a position of each node, the viewshed including a set whose elements comprise other nodes having an optical line of sight to each node, and counting the number of the elements in the viewshed to determine a cardinality size of the viewshed as the visibility of each node for quantifying an extent to which a traveler is exposed when traveling across terrain represented by each node, the speed analyzer configured for retrieving a land cover map and traversal matrix, querying the land cover map for a terrain type for each node using a position of each node, returning a speed of the terrain type found in the traversal matrix representing how fast the traveler can travel across terrain represented by each of the nodes;
a minimum edge cost finder for generating a minimum cost edge using said blended cost grid and configured for searching edges of a graph to find the minimum cost edge used for computing heuristics, the minimum cost edge being the edge with a minimum blended cost between any two adjacent nodes in the graph; and
the route generator configured for generating routes that facilitate tactical movement based on said blended cost grid and computed heuristics.

8. A method for generating tactical routes, the method comprising:
providing a global positioning system having an input operable to receive user input to place one or more waypoints; the global positioning system further including a system for generating at least one additional waypoint at least partially responsive to the waypoint placed based on the received user input, the system for generating at least one additional waypoint performing:
pre-populating an intervisibility database with pre-computed optical lines of sight between locations or nodes in geographic terrain;
analyzing with an intervisibility analyzer propagation of the pre-computed optical lines of sight between the locations or nodes in the geographic terrain;
analyzing with a speed analyzer speeds of travelers across the locations or nodes in the geographic terrain;
generating with a cost generator a blended cost grid using said intervisibility and speed analyses; and
generating with a route generator routes that facilitate tactical movement based on said blended cost grid, the route generator computing intervisibility unions at the locations or nodes in the geographic terrain and minimizing intervisibility unions along the generated route.

9. The method of claim 8, further comprising meeting a speed constraint with said route generator, and at least one of:
computing intervisibility sums with said route generator;
minimizing intervisibility sums with said route generator;
maximizing intervisibility sums per distance traveled with said route generator; and
maximizing intervisibility unions per distance traveled with said route generator.

10. The method of claim 8, further comprising avoiding slow areas with said route generator, and at least one of:
computing intervisibility sums with said route generator;
minimizing intervisibility sums with said route generator;
maximizing intervisibility sums per distance traveled with said route generator; and
maximizing intervisibility unions per distance traveled with said route generator.

11. The method of claim 8, further comprising:
generating with the intervisibility analyzer a viewshed for each node using a position of each node, the viewshed including a set whose elements comprise other nodes having an optical line of sight to each node, and counting the number of the elements in the viewshed to determine a cardinality size of the viewshed as the visibility of each node for quantifying an extent to which a traveler is exposed when traveling across terrain represented by each node;
retrieving with the speed analyzer a land cover map and traversal matrix, querying the land cover map for a terrain type for each node using a position of each node, returning a speed of the terrain type found in the traversal matrix representing how fast the traveler can travel across terrain represented by each of the nodes;
generating with a minimum edge cost finder a minimum cost edge using said blended cost grid and configured for searching edges of a graph to find the minimum cost edge used for computing heuristics, the minimum cost edge being the edge with a minimum blended cost between any two adjacent nodes in the graph; and
generating with the route generator routes that facilitate tactical movement based on said blended cost grid and computed heuristics.

12. A computer program product for generating tactical routes, and including one or more computer readable instructions embedded on a tangible, non-transitory computer readable medium, and configured to cause one or more computer processors to perform the steps of:
pre-populating an intervisibility database with pre-computed optical lines of sight between locations or nodes in geographic terrain;
analyzing with an intervisibility analyzer propagation of the pre-computed optical lines of sight between the locations or nodes in the geographic terrain;
analyzing with a speed analyzer speeds of travelers across the locations or nodes in the geographic terrain;
generating with a cost generator a blended cost grid using said intervisibility and speed analyses; and
generating with a route generator routes that facilitate tactical movement based on said blended cost grid, the route generator computing intervisibility unions at the locations or nodes in the geographic terrain and minimizing intervisibility unions along the generated route.

13. The computer program product of claim 12, further comprising meeting a speed constraint with said route generator, and at least one of:
computing intervisibility sums with said route generator;
minimizing intervisibility sums with said route generator;
maximizing intervisibility sums per distance traveled with said route generator; and
maximizing intervisibility unions per distance traveled with said route generator.

14. The computer program product of claim 12, further comprising avoiding slow areas with said route generator, and at least one of:
computing intervisibility sums with said route generator;
minimizing intervisibility sums with said route generator;
maximizing intervisibility sums per distance traveled with said route generator; and
maximizing intervisibility unions per distance traveled with said route generator.

15. The computer program product of claim 12, further comprising:
generating with the intervisibility analyzer a viewshed for each node using a position of each node, the viewshed including a set whose elements comprise other nodes having an optical line of sight to each node, and counting the number of the elements in the viewshed to determine a cardinality size of the viewshed as the visibility of each node for quantifying an extent to which a traveler is exposed when traveling across terrain represented by each node;
retrieving with the speed analyzer a land cover map and traversal matrix, querying the land cover map for a terrain type for each node using a position of each node, returning a speed of the terrain type found in the traversal matrix representing how fast the traveler can travel across terrain represented by each of the nodes;
generating with a minimum edge cost finder a minimum cost edge using said blended cost grid and configured for searching edges of a graph to find the minimum cost edge used for computing heuristics, the minimum cost edge being the edge with a minimum blended cost between any two adjacent nodes in the graph; and
generating with the route generator routes that facilitate tactical movement based on said blended cost grid and computed heuristics.

* * * * *